(12) United States Patent
Nakano et al.

(10) Patent No.: US 6,426,396 B2
(45) Date of Patent: *Jul. 30, 2002

(54) PROCESS FOR PRODUCING POLY (CYCLIC CONJUGATED DIENE)

(75) Inventors: Mitsuru Nakano; Arimitsu Usuki; Qing Yao, all of Aichi (JP)

(73) Assignee: Kabushiki Kaisha Toyota Chuo Kenkyusho, Aichi-gun (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,054

(22) Filed: May 6, 1999

(30) Foreign Application Priority Data

May 8, 1998 (JP) .......................................... 10-126538
Nov. 13, 1998 (JP) .......................................... 10-323811

(51) Int. Cl.[7] .............................. C08F 4/80; C08F 32/06
(52) U.S. Cl. ...................... 526/171; 526/131; 526/134; 526/159; 526/161; 526/170; 526/172; 526/204; 526/240; 526/279; 526/308; 526/309; 525/326.5; 525/328.8; 525/329.5; 528/357; 528/392
(58) Field of Search ............... 526/169.1, 171, 526/308, 309, 204, 159, 161, 131, 134, 170, 172, 240, 279; 525/326.5, 328.8, 328.9, 329.5; 528/357, 392

(56) References Cited

U.S. PATENT DOCUMENTS 3,328,372 A * 6/1967 Thomas .................. 526/308 X
3,379,701 A * 4/1968 Gladding et al. ....... 526/308 X
4,113,930 A * 9/1978 Moczygemba .......... 526/118 X
4,127,710 A * 11/1978 Hsieh ..................... 526/308 X
5,128,418 A * 7/1992 Grubbs et al. .......... 526/309 X
5,792,824 A * 8/1998 Natori .................... 526/347 X
5,830,965 A * 11/1998 Imaizumi et al. ........... 526/309

FOREIGN PATENT DOCUMENTS

| JP | 6-211916 | 8/1994 |
| JP | 7-247321 | 9/1995 |
| JP | 8-225614 | 9/1996 |

OTHER PUBLICATIONS

Douglas L. Gin, et al., "Stereoregular Precursors to Poly(p–phenylene) Via Transition–Metal–Catalyzed Polymerization. 1. Precursor Design and Synthesis," J. Am. Chem. Soc., vol. 116, No. 23, (1994), pp. 10507–10519.
Derwent Abstracts, Accession No. 74–28449V/197415, SU 271018 A, Sep. 3, 1973.
Derwent Abstracts, Accession No. 72–68551T/197243, GB 1294167.

* cited by examiner

*Primary Examiner*—Fred Teskin
(74) *Attorney, Agent, or Firm*—Oblon, Spivak, McClelland, Maier & Neustadt, P.C.

(57) ABSTRACT

Poly(cyclic conjugated diene) polymers are prepared by polymerizing a cyclic conjugated diene monomer or cyclic conjugated diene monomer and a double bond-containing monomer using a transition metal catalyst, preferably a Ni-based catalyst, in a non-polar solvent containing a basic compound or an aromatic halide solvent. The poly(cyclic conjugated diene) polymer may then be subsequently modified by reaction of at least one of the double bonds of the polymer with a modifying substance, for example hydrogen.

18 Claims, 2 Drawing Sheets

PROCESS FOR PRODUCING POLY (CYCLIC CONJUGATED DIENE)

BACKGROUND OF THE INVENTION

1. Field of the Invention

The present invention relates to a poly(cyclic conjugated diene), and specifically to a poly(cyclic conjugated diene) derived from a specified cyclic conjugated diene monomer, and a process for producing the same; and a paraphenylene polymer and a polymerizing process for the same.

2. Description of the Related Art

Conventionally, various attempts have been made to produce a poly(cyclic conjugated diene) by polymerizing a cyclic conjugated diene monomer, a typical example of which is 1,3-cyclohexadiene. In particular, polymers of cyclic conjugated diene monomers having a high 1,4-position content have been expected as polymers having improved thermal, mechanical and electric properties such as high heat resistance and rigidity, a lowered specific gravity and a lowered dielectric constant, resulting from the linear polymerization thereof.

Japanese Laid-Open Patent Publication No. 7-247321 discloses a polymerizing process of cyclic conjugated diene using a complex compound of an organic compound containing an IA-group metal such as lithium or sodium as an anionic polymerization catalyst. According to this polymerizing process, the cyclic conjugated diene monomer can be polymerized in a high degree by the organic metal compound which forms the complex.

In this process, however, a comonomer for synthesizing a copolymer is restricted to an anionic polymerizable monomer. This is an substantial problem of an anionic polymerizing process.

Japanese Laid-Open Patent Publication No. 6-211916 discloses a polymerizing process of a conjugated diene group using a composite catalyst including a rare-earth metal compound. However, in this process, a sufficient polymer yield cannot be obtained since the rare-earth catalyst has a very high reactivity with a polar compound. Moreover, it is impossible to polymerize a cyclic conjugated diene monomer having a polar functional group. In addition, the usable kind of comonomers may be limited.

As described above, in these processes for producing a cyclic diene polymer, the kind of monomers or comonomers which can be selected is greatly restricted, and polymerization activity is also insufficient.

There is a process of producing polyparaphenylene using a poly(cyclic conjugated diene) as a precursor. The poly-paraphenylene has been expected as a conductive polymer material, but is not dissolved in any solvent, and it is not melted even when heated. Thus, polyparaphenylene is difficult to mold. As an effective method for solving the problem, there is a conventional method of polymerizing a cyclohexadiene derivative to obtain a polymer, using the polymer as an soluble precursor to make a film or the like, and then removing substituents from the cyclohexadiene derivative to convert it into polyparaphenylene.

However, the conventional method has the following problem. First, in the polymerization of cyclohexadiene derivatives by radical polymerizing process, the position-selectivity and stereo-selectivity of the molecular structure of the polymer are low. Accordingly, the ratio of the conversion into polyparaphenylene is low so that only a polymer material having a low conductivity can be obtained. Second, in the polymerizing process of a cyclohexadiene derivative using a neutral Ni catalyst, the kind of the polymerizable cyclohexadiene derivatives is limited although the position-selectivity and stereo-selectivity of the molecular structure of the polymer are high. Its activity is also low, and further monomers which can be copolymerized are also restricted.

SUMMARY OF THE INVENTION

An object of the present invention is to provide a poly(cyclic conjugated diene) and a polymerizing process for the same; and a phenylene polymer and a process for producing the same, each of which is improved to solve the above-mentioned problems in the related art.

In order to solve the above-mentioned problems, the inventors have eagerly made investigations to succeed in providing a new poly(cyclic conjugated diene) by using a specific catalyst to polymerize a cyclic conjugated diene monomer, and simultaneously succeeded in providing an improved process for polymerizing a cyclic conjugated diene monomer. Thus, the inventors have completed the present invention.

That is, the present invention is a poly(cyclic conjugated diene) comprising: a molecular structure unit having the formula (I) (the molecular structure unit is referred to as a molecular structure unit (A) in this specification) derived from at least one cyclic conjugated monomer, and the unit being bonded to each other at 1,4-position and/or 1,2-position

[Scheme 29]

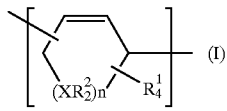
(I)

wherein n is an integer of 1–6; each X individually represents a carbon, silicon or germanium atom; each $R^1$ individually represents a hydrogen atom or halogen atom, an alkyl, unsaturated hydrocarbon, aryl, cycloalkyl or cyclodienyl group, or a 5–10-membered heterocyclic group having at least one of nitrogen, oxygen and sulfur atoms as a heteroatom; at least one of each individual $R^2$ represents an aryl substituted with a hydroxyl group and an alkyl group having 1–4 carbon atoms, iminocarboxyl, alkoxyl, aryloxyl, or alkoxysilyl group, $-(CH_2)_p-OH$, $-(CH_2)_p-C(O)-OH$, $-(CH_2)_p-C(O)-OR^3$, $-(CH_2)_p-OR^3$, $-(CH_2)_p-OC(O)-R^3$, $-(CH_2)_p-OC(O)-OR^3$, $-(CH_2)_p-C(O)-R^3$, $-(CH_2)_p-O-(CH_2)_p OH$ wherein each p is respectively an integer of 0–24, $R^3$ is a linear chain or branched alkyl or aryl group, or a group represented by the following formulae (a)–(h) (in the formulae (a)–(h), Y is a hydrogen atom, an alkyl, alkoxyl, alkoxycarbonyl or cyano group) (these groups of $R^2$ are referred to as the polar groups in this specification), or an alkylsilyl, halogenated alkyl, halogenated cycloalkyl, halogenated aryl or halogenated aralkyl group (these groups of $R^2$ are referred to as the non-polar groups); the other $R^2$ represents a hydrogen or halogen atom, a linear chain or branched alkyl, cycloalkyl, alkylidenyl, aryl, aralkyl, alkynyl, vinyl, alkenyl group wherein a supplied alkenyl radical does not contain any terminal double bond, cyclodienyl group, or a 5–10-membered heterocyclic group having at least one of nitrogen, oxygen and sulfur atoms as a heteroatom (these groups of $R^2$ are referred to as the substituents); and optionally any two $R^2$s are bonded to each other to form a cyclic structure.

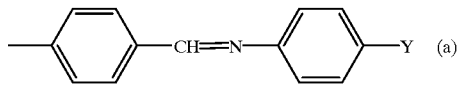
[Scheme 30] (a)

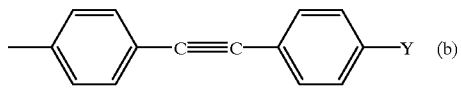
[Scheme 31] (b)

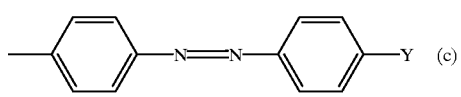
[Scheme 32] (c)

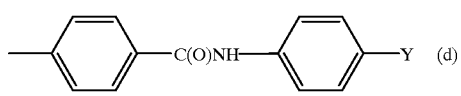
[Scheme 33] (d)

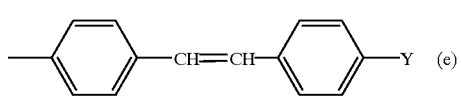
[Scheme 34] (e)

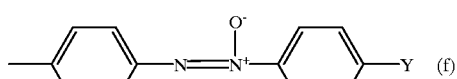
[Scheme 35] (f)

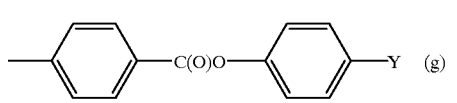
[Scheme 36] (g)

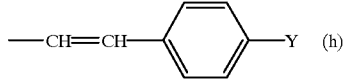
[Scheme 37] (h)

Further, the present invention is a poly(cyclic conjugated diene) comprising: a molecular structure unit having the formula (II) (the molecular structure unit is referred to as molecular structure unit (B) in this specification) derived from at least one cyclic conjugated diene monomer, and the unit being bonded to each other at 1,4-position and/or 1,2-position:

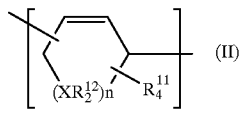
[Scheme 38]
(II)

wherein n is an integer of 1–6; each X is individual and at least one of them is a silicon or germanium atom; the other X is/are carbon atom(s); each $R^{11}$ individually represents a hydrogen or halogen atom, an alkyl, unsaturated hydrocarbon, aryl, cycloalkyl or cyclodienyl group, or a 5–10-membered heterocyclic group having at least one of nitrogen, oxygen and sulfur atoms as a heteroatom; each $R^{12}$ individually represents a hydrogen or halogen atom, a linear chain or branched alkyl, cycloalkyl, alkylidenyl, aryl, aralkyl, alkynyl, vinyl, alkenyl group wherein a supplied alkenyl radical does not contain any terminal double bond, cyclodienyl group, or a 5–10-membered heterocyclic group having at least one of nitrogen, oxygen and sulfur atoms as a heteroatom (i.e., the substituents); and optionally any two $R^{12}$s are bonded to each other to form a cyclic structure.

In addition, the present invention is a copolymer comprising two or more kinds of molecular structure units selected from the following 4 kinds of molecular structure units, wherein the molecular structure units (A), (B) and (C) are bonded to a polymer chain at 1,4-position and/or 1,2-position:

one or more kinds of molecular structure unit (molecular structure unit (A)) represented by the formula (I):

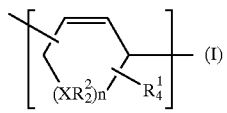
[Scheme 39]
(I)

wherein n is an integer of 1–6; each X individually represents a carbon, silicon or germanium atom; each $R^1$ individually represents a hydrogen atom or halogen atom, an alkyl, unsaturated hydrocarbon, aryl, cycloalkyl or cyclodienyl group, or a 5–10-membered heterocyclic group having at least one of nitrogen, oxygen and sulfur atoms as a heteroatom; each $R^2$ is individual and at least one of $R^2$s is aryl group substituted with a hydroxyl group and an alkyl group having 1–4 carbon atoms, iminocarboxyl, alkoxyl, aryloxyl, or alkoxysilyl group, —$(CH_2)_p$—OH, —$(CH_2)_p$—C(O)—OH, —$(CH_2)_p$—C(O)—$OR^3$, —$(CH_2)_p$—$OR^3$, —$(CH_2)_p$—OC(O)—$R^3$, —$(CH_2)_p$—OC(O)—$OR^3$, —$(CH_2)_p$—C(O)—$R^3$, —$(CH_2)_p$—O—$(CH_2)_p$OH wherein each p is respectively an integer of 0–24, $R^3$ is a linear chain or branched alkyl or aryl group, or a group represented by the following formulae (a)–(h) (in the formulae (a)–(h), Y is a hydrogen atom, an alkyl, alkoxyl, alkoxycarbonyl or cyano group) (these groups of $R^2$ are referred to as the polar groups in this specification), or an alkylsilyl, halogenated alkyl, halogenated cycloalkyl, halogenated aryl or halogenated aralkyl group (these groups of $R^2$ are referred to as the non-polar groups); the other $R^2$ represents a hydrogen or halogen atom, a linear chain or branched alkyl, cycloalkyl, alkylidenyl, aryl, aralkyl, alkynyl, vinyl, alkenyl group wherein a supplied alkenyl radical does not contain any terminal double bond, cyclodienyl group, or a 5–10-membered heterocyclic group having at least one of nitrogen, oxygen and sulfur atoms as a heteroatom (these groups of $R^2$ are referred to as the substituents); and optionally any two $R^2$s are bonded to each other to form a cyclic structure,

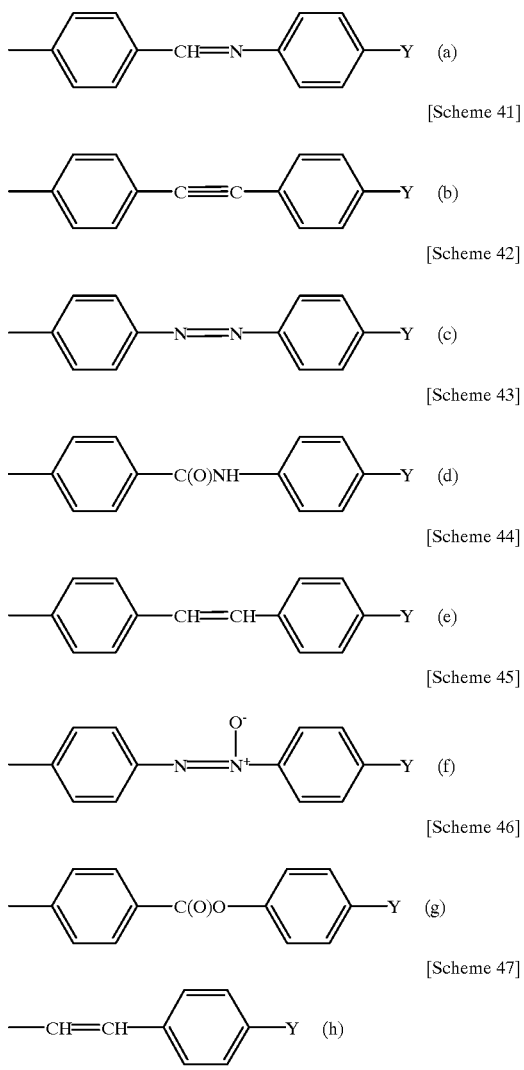

one or more kinds of molecular structure unit (molecular structure unit (B)) represented by the formula (II):

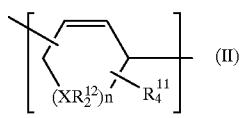

wherein n is an integer of 1–6; each X is individual and at least one of them is a silicon or germanium atom; the other X is/are carbon atom(s); each $R^{11}$ individually represents a hydrogen or halogen atom, an alkyl, unsaturated hydrocarbon, aryl, cycloalkyl or cyclodienyl group, or a 5–10-membered heterocyclic group having at least one of nitrogen, oxygen and sulfur atoms as a heteroatom; each $R^{12}$ individually represents a hydrogen or halogen atom, a linear chain or branched alkyl, substituted or non-substituted cycloalkyl, alkylidenyl, aryl, aralkyl, alkynyl, vinyl, alkenyl group wherein a supplied alkenyl radical does not contain any terminal double bond, cyclodienyl group, or a 5–10-membered heterocyclic group having at least one of nitrogen, oxygen and sulfur atoms as a heteroatom; and optionally any two $R^{12}$ s are bonded to each other to form a cyclic structure, one or more kinds of molecular structure unit represented by the following formula (III) (the molecular structure unit may be referred to as molecular structure unit (C)):

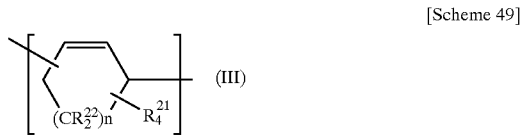

wherein n is an integer of 1–6; each $R^{21}$ individually represents a hydrogen or halogen atom, an alkyl, unsaturated hydrocarbon, aryl, cycloalkyl or cyclodienyl group, or a 5–10-membered heterocyclic group having at least one of nitrogen, oxygen and sulfur atoms as a heteroatom; each $R^{22}$ individually represents a hydrogen or halogen atom, a linear chain or branched alkyl, substituted or non-substituted cycloalkyl, alkylidenyl, aryl, aralkyl, alkynyl, vinyl, alkenyl group wherein a supplied alkenyl radical does not contain any terminal double bond, cyclodienyl group, or a 5–10-membered heterocyclic group having at least one of nitrogen, oxygen and sulfur atoms as a heteroatom; and optionally any two $R^{22}$ s are bonded to each other to form a cyclic structure, one or more kinds of molecular structure units derived from one or more kinds of monomers selected from monomers containing a double bond (the molecular structure unit is referred to as molecular structure unit (D)).

Additionally, the present invention is a poly(cyclic conjugated diene) wherein molecular structure unit (the molecular structure unit is referred to as the molecular structure unit (C)) is represented by the following formula (III) and the molecular structure unit is bonded to each other at 1,4-position and/or 1,2-position:

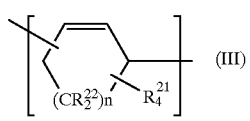

wherein n, X, $R^{21}$ and $R^{22}$ have the same meanings as defined in the formula (IIIA), the polymer being obtained by using a compound represented by the following (IV) (which may be referred to as the present mono-component catalyst):

[Scheme 51]

wherein M represents a transition metal element of the eighth, ninth or tenth group in the periodic table; L represents a ligand having 1–3 π bonds; X represents a ligand having at least one σ bond and 0–3π bonds; n is 0,1 or 2; m is 0 or 1; both of n and m are not 0 at the same time; when m is 0, a is 2; when m is 1, a is 1; and A represents a counter anion of $[L_nMX_m]^{a+}$, so as to polymerize one or more kinds of cyclic conjugated diene monomers represented by the following formula (IIIA) (the monomer(s) may be referred to as monomer(s) (C)):

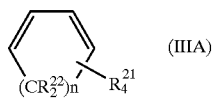

[Scheme 50]

(IIIA)

wherein n is an integer of 1–6; each $R^{21}$ individually represents a hydrogen or halogen atom, an alkyl, unsaturated hydrocarbon, aryl, cycloalkyl or cyclodienyl group, or a 5–10-membered heterocyclic group having at least one of nitrogen, oxygen and sulfur atoms as a heteroatom; each $R^{22}$ individually represents a hydrogen or halogen atom, a linear chain or branched alkyl, substituted or non-substituted cycloalkyl, alkylidenyl, aryl, aralkyl, alkynyl, vinyl, alkenyl group wherein a supplied alkenyl radical does not contain any terminal double bond, cyclodienyl group, or a 5–10-membered heterocyclic group having at least one of nitrogen, oxygen and sulfur atoms as a heteroatom; and optionally any two $R^{22}$s are bonded to each other to form a cyclic structure.

Besides, the present invention is a process for producing a poly(cyclic conjugated diene) comprising the step of polymerizing a cyclic conjugated diene monomer or a cyclic conjugated diene monomer and a double bond-containing monomer by using a compound represented by the following formula (IV) (which is referred to as the present monocomponent catalyst in this specification):

[Scheme 53]

$$[L_nMX_m]^{a+}[A]^{a-} \quad (IV)$$

wherein M represents a transition metal element of the eighth, ninth or tenth group in the periodic table; L represents a ligand having 1–3π bonds; X represents a ligand having at least one σ bond and 0–3π bonds; n is 0, 1 or 2; m is 0 or 1; both of n and m are not 0 at the same time; when m is 0, a is 2; when m is 1, a is 1; and A represents a counter anion of $[L_nMX_m]^{a+}$, or a multi-component catalyst containing:
(a) a transition metal compound of a transition metal element of the eighth, ninth or tenth group in the periodic table, and
(b) an organic aluminum compound, and/or
(c) an electron donating component (the multi-component catalyst may be referred to as the present multi-component catalyst in this specification).

The present invention has the following advantages.

(1) It is possible to provide a new poly(cyclic conjugated diene) and a process for producing the same.

(2) It is possible to provide a modifying product or a hydrogenated product of a poly(cyclic conjugated diene) having high heat resistance and oxidation resistance, and a hydrogenating process for them by adding hydrogen to the poly(cyclic conjugated diene).

(3) It is possible to obtain a poly(cyclic conjugated diene) at a high yield by conducting polymerizing reaction of a cyclic conjugated diene monomer in the presence of a base compound.

(4) It is possible to obtain a poly(cyclic conjugated diene) at a high yield by conducting polymerizing reaction of a cyclic conjugated diene monomer in an aromatic halide.

(5) It is possible to obtain a poly(cyclic conjugated diene) having a high crystallizability by conducting polymerizing reaction of a cyclic conjugated diene monomer in the presence of a Ni-based catalyst.

(6) It is possible to obtain a phenylene polymer at a high yield by conducting polymerizing reaction of a cyclohexadiene derivative in the presence of a Ni-based catalyst.

Figure 1:
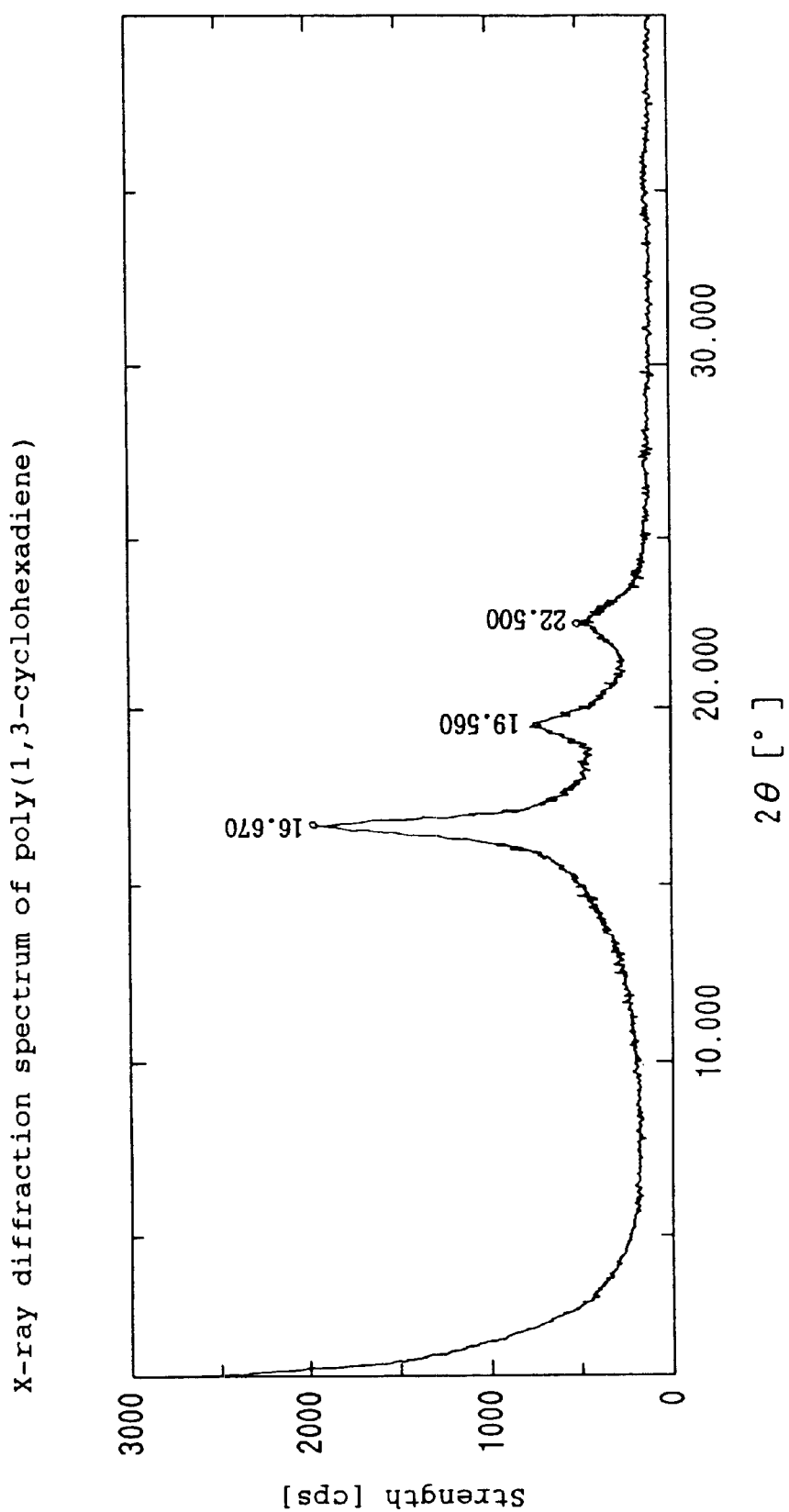
FIG. 1 is a graphical representation showing an X-ray diffraction spectrum of a crystalline poly(1,3-cyclohexadiene).

DETAILED DESCRIPTION OF THE INVENTION (1) Poly(Cyclic Conjugated Diene) Having a Molecular Structure Unit (A)

In this specification, the molecular structure unit of the poly(cyclic conjugated diene) represented by the formula (I) is referred to as the molecular structure unit (A). A monomer from which this molecular structure unit (A) originates is referred to as a monomer A.

The basic skeleton of the molecular structure unit (A) and the monomer A preferably has a 5–8-membered ring and more preferably has a 6-membered ring.

The molecular structure unit (A) is derived from the monomer A represented by the following formula (IA) as shown by the following reaction scheme 55.

[Scheme 54]

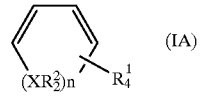

(IA)

wherein n, X, $R^1$, $R^2$ and $R^3$ have the same meanings as defined in the formula (I).

[Scheme 55]

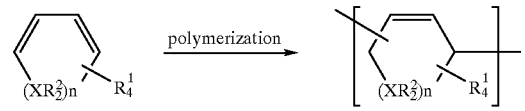

The monomer A represented by the above-described formula (IA) is a cyclic conjugated diene made mainly of carbon—carbon bonds and having a 5 or more-membered ring. The substituents $R^1$, $R^2$ and $R^3$ in the monomer A correspond to the substituents $R^1$, $R^2$ and $R^3$, respectively, in the molecular structure unit of the poly(cyclic conjugated diene) derived from the monomer A.

Each X in the monomer A and in the molecular structure unit (A) individually represents a carbon, silicon or germanium atom.

n is an integer of 1–6, and preferably 1–4.

The monomer A is preferably a derivative of a cyclic conjugated diene made mainly of carbon—carbon bonds and having a 5–8-membered ring, and especially preferably a derivative of a cyclic conjugated diene having a 6-membered ring.

Examples of the monomer A having a 5–8-membered ring include derivatives of 1,3-cyclopentadiene, 1,3-cyclohexadiene, 1,3-cycloheptadiene, and 1,3-cyclooctadiene; monomers A wherein the carbon atom corresponding to X in the above-mentioned derivatives is substituted with a silicon or germanium atom. Examples of the cyclic conjugated diene monomer having a 6-membered ring include derivatives of 1,3-cyclohexadiene.

In the monomer A and the molecular structure unit (A), a halogen atom of $R^1$ is preferably fluorine, chlorine, bromine or iodine, and more preferably chlorine. An alkyl group of $R^1$ is one having preferably 1–20 carbon atoms and more preferably 1–10 carbon atoms. The alkyl group may be a linear chain or branched group. In view of steric hindrance, a linear chain alkyl group is preferred. Specific examples thereof include methyl, ethyl, n-propyl, isopropyl, n-butyl, isobutyl, n-pentyl, n-hexyl, n-heptyl, n-octyl, n-nonyl, and n-decyl groups.

The unsaturated aliphatic hydrocarbon group preferably has 2–20 carbon atoms and more preferably has 2–10 carbon atoms. The number of carbon atoms of the aryl group is preferably 5–20 and more preferably 5–10. The number of carbon atoms of the cycloalkyl group is preferably 3–20 and more preferably 5–10. The number of carbon atoms of the cyclodienyl group is preferably 4–20 and more preferably 5–10. Specific examples of these groups include cyclopentyl, cyclohexyl, vinyl, phenyl, tolyl, naphthyl, cyclopendadienyl, and indenyl groups. Specific examples of the heterocyclic group include pyridine and piperidinyl groups.

At least one $R^2$ in the monomer A and the molecular structure unit (A) is the present polar group or the non-polar group.

Examples of the polar group include an iminocarboxyl group, organic functional groups containing this group, and aryl groups substituted with a hydroxyl group and an alkyl group having 1–4 carbon atoms.

The alkoxyl group of the present polar group is one having preferably 1–20 carbon atoms, and more preferably 1–20 carbon atoms. Specific examples thereof include methoxy, ethoxy, n-propioxy, sec-propioxy, n-butoxy, sec-butoxy and tert-butoxy groups.

The aryloxyl group of the present polar group is one having preferably 5–20 carbon atoms, and more preferably 5–10 carbon atoms. Specific examples thereof include phenoxy, paramethylphenoxy, and paraethylphenoxy groups.

The alkoxysilyl group of the present polar group is one having preferably 3–20 carbon atoms, and more preferably 3–10 carbon atoms. Specific examples thereof include trimethoxysilyl and triethoxysiliyl groups.

Examples of the present polar group also include organic functional groups having a structure such as —OH—, —O—, —(O)OH, —C(O)O—, —OC(O)—, OC(O)O— or —C(O)—.

Specific examples thereof include an aryl group substituted with a hydroxyl group and an alkyl group having 1–4 carbon atoms, iminocarboxyl, alkoxyl, aryloxyl, or alkoxysilyl group, —(CH$_2$)$_p$—OH, —(CH$_2$)$_p$—C(O)—OH, —(CH$_2$)$_p$—C(O)— OR$^3$, —(CH$_2$)$_p$—OR$^3$, —(CH$_2$)$_p$—OC(O)—R$^3$, —(CH$_2$)$_p$—OC(O)—OR$^3$, —(CH$_2$)$_p$—C(O)—R$^3$, —(CH$_2$)$_p$—O—(CH$_2$)$_p$OH wherein p is each individually an integer of 0–24, $R^3$ is a linear chain or branched alkyl or aryl group, or a substituent represented by the following formulae (a)–(h) (in the formulae (a)–(h), Y is a hydrogen atom, an alkyl, alkoxyl, alkoxycarbonyl or cyano group).

The alkylsilyl group of the present non-polar group is one having preferably 3–20 carbon atoms, and more preferably 3–10 carbon atoms. Specific examples thereof include trimethylsilyl, triethylsilyl, dimethylisopropylsilyl and dimethyl tert-butyl silyl groups.

The halogenated alkyl group of the present non-polar group is preferably one having 1–20 carbon atoms. The alkyl group may be a linear chain or branched group. Specific examples thereof include methyl, ethyl, n-propyl, isopropyl, n-butyl, isobutyl, tert-butyl, pentyl, hexyl, heptyl, octyl, nonyl and decyl groups.

In fluorinated alkyl groups represented by the general formula —C$_m$F$_{2m+1}$, m is preferably 1–20 and more preferably 1–10.

The cyclic skeleton in the halogenated cycloalkyl group of the non-polar group is one having preferably 3–10 carbon atoms and more preferably 5–8 carbon atoms. Specific examples thereof include cyclopentyl, cyclohexyl, cycloheptyl and cyclooctyl groups.

The cyclic skeleton in the halogenated aryl group of the non-polar group is one having preferably 6–40 carbon atoms and more preferably 6–10 carbon atoms. Specific examples thereof include phenyl, tolyl and naphtyl groups.

The aralkyl group of the halogenated aralkyl group of the non-polar group is preferably one having 7–15 carbon atoms.

As the halogen atom in these halogenated hydrocarbon groups, fluorine, chlorine, bromine and iodine are preferable, and especially chlorine is more preferable.

It is sufficient that at least one $R^2$ group in the monomer A and molecular structure unit (A) is the polar group or the non-polar group. Therefore, the following are allowable: the monomer A or the molecular structure unit (A) wherein only one $R^2$ is the polar group, wherein only one $R^2$ is the non-polar group, wherein all $R^2$ are the polar groups, wherein all $R^2$ are the non-polar groups, or wherein the polar group and the non-polar group are present together as $R^2$.

In the case that as $R^2$ there are other groups than the present polar and non-polar groups, each $R^2$ individually represents a hydrogen or halogen atom, an alkyl, cycloalkyl, alkylidenyl, aryl, aralkyl, alkynyl, vinyl, alkenyl (wherein a supplied alkenyl radical does not contain any terminal double bond), cyclodienyl group, or a 5–10-membered heterocyclic group, all of which include at least one of nitrogen, oxygen and sulfur atoms as a heteroatom (i.e., the substituents). In this case, the halogen atom is preferably fluorine, chlorine, bromine or iodine, and more preferably chlorine.

The alkyl group of the substituent is preferably one having 1–20 carbon atoms. The alkyl group may be a linear chain or branched group. Specific examples thereof include methyl, ethyl, n-propyl, isopropyl, n-butyl, isobutyl, tert-butyl, pentyl, hexyl, heptyl, octyl, nonyl and decyl groups.

The alkenyl group of the substituent is one having preferably 2–20 carbon atoms and more preferably 2–10 carbon atoms. Specific examples thereof include vinyl and allyl groups.

The alkynyl group of the substituent is one having preferably 2–20 carbon atoms and more preferably 2–10 carbon atoms. Specific examples thereof include ethynyl, propynyl and butynyl groups.

The cyclic skeleton in the cycloalkyl group of the substituent is one having preferably 3–10 carbon atoms and more preferably 5–8 carbon atoms. Specific examples thereof include cyclopentyl, cyclohexyl, cycloheptyl and cyclooctyl groups.

The aryl group of the substituent is one having preferably 5–40 carbon atoms and more preferably 6–10 carbon atoms. Specific examples thereof include phenyl, tolyl and naphtyl groups.

The aralkyl group of the substituent is one having preferably 7–15 carbon atoms.

The alkylidenyl group of the substituent is preferably one having 1–6 carbon atoms. Specific examples thereof include ethylidenyl and propidenyl groups.

The cyclodienyl group of the substituent is one having preferably 3–20 and more preferably 5–10. Specific examples thereof include a cyclopentadienyl group.

Among groups $R^2$, any two groups can be bonded to each other to form a cyclic structure. The monomer A and the molecular structure unit (A) having an acid anhydride or dicarboxyimide structure can be given as examples.

Specific examples of such a monomer A include the following compounds. With these examples, the molecular structure unit (A) derived from these monomers are also given as examples.

[Scheme 56]

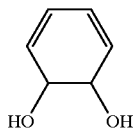

[Scheme 57]

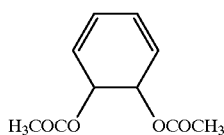

[Scheme 58]

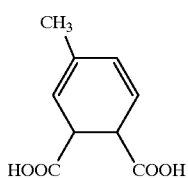

[Scheme 59]

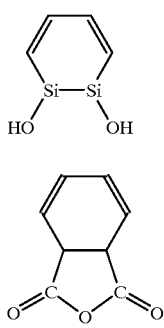

[Scheme 60]

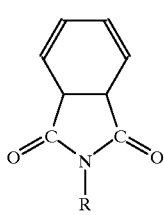

wherein R represents an alkyl group having 1–20 carbon atoms, or an aryl group having 6–40 carbon atoms.

[Scheme 62]

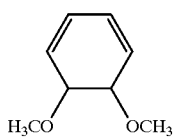

[Scheme 63]

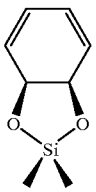

In the poly(cyclic conjugated diene) having a molecular structure unit (A) and derived from one or more monomers A, its molecular structure unit may be one or more kinds.

The molecular structure unit (A) is bonded at 1,4position and/or 1,2-position. The ratio of the 1,4-position to the 1,2-position varies and can be controlled by the kinds of the monomer and a catalyst, reaction conditions and the like.

(2) Poly(Cyclic Conjugated Diene) Having a Molecular Structure Unit (B)

In this specification, the molecular structure unit of the poly(cyclic conjugated diene) represented by the formula (II)is referred to as the molecular structure unit (B). A monomer from which this molecular structure unit (B) originates is referred to as a monomer B.

The molecular structure unit (B) is derived from a monomer B shown in the following formula (IIA), as shown in the scheme 65.

[Scheme 64]

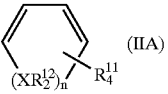

wherein n, X, $R^{11}$ and $R^{12}$ have the same meanings as defined in the formula (II).

[Scheme 65]

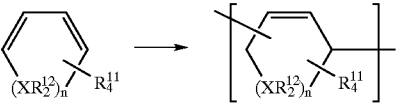

The monomer B represented by the formula (IIA) is a cyclic conjugated diene having a 5 or more-membered ring constituted mainly of carbon—carbon bonds.

The basic skeleton of the monomer B and the molecular structure unit (B) is preferably a 5–8-membered ring and more preferably 6-membered ring.

Each X is independent in the monomer B and the molecular structure unit (B) and at least one of them is a silicon or germanium atom. Other X not silicon nor germanium atoms is/are carbon atom(s).

n is an integer of 1–6 and preferably 1–4.

Groups $R^{11}$ and $R^{12}$ in the monomer B correspond to the groups $R^{11}$ and $R^{12}$ in the molecular structure unit (B) of the poly(cyclic conjugated diene) derived from this monomer B, respectively. The monomer B is preferably a derivative of a cyclic conjugated diene having a 5–8-membered ring constituted mainly of carbon—carbon bonds, and more preferably a derivative of a cyclic conjugated diene having a 6-membered ring.

$R^{11}$ in the monomer B and the molecular structure unit (B) has the same meaning as $R^1$ in the monomer A and the molecular structure unit (A). Therefore, the preferable groups in the monomer A and the molecular structure unit (A) are also preferable for $R^{11}$.

$R^{12}$ in the monomer B and the molecular structure unit (B) has the same meaning as the substituent of $R^2$ in the monomer A and the molecular structure unit (A). Therefore, the preferable groups of the substituent are also preferable for $R^{12}$.

An example of the monomer B may be the following monomer.

[Scheme 66]

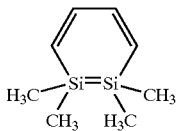

In the poly(cyclic conjugated diene) having a molecular structure unit (B) derived from one or more monomers B which is selected from the monomers B, its molecular structure unit may be one or more kinds.

The molecular structure unit (B) is bonded at 1,4-position and/or 1,2-position. The ratio of the 1,4-position to the 1,2-position varies and can be controlled by the kinds of the monomer and a catalyst, reaction conditions and the like.

(3) Copolymer Having One or More Kinds Selected from the Molecular Structure Units (A), (B), (C) and (D).

The present invention also provides a copolymer comprising one or more kinds of molecular structure unit selected from four kinds of the molecular structure units (A), (B), (C) and (D).

The molecular structure unit (C) is represented by the formula (III). A monomer from which this molecular structure unit (C) originates is referred to as a monomer C. The molecular structure unit (C) is derived from the monomer C represented by the formula (IIIA) in the same way as the molecular structure unit (A) is derived from the monomer A.

[Scheme 67]

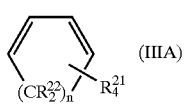

(IIIA)

wherein n, X, $R^{21}$ and $R^{22}$ have the same meanings as defined in the formula (III).

The basic skeleton of the monomer C is preferably a cyclic conjugated diene having a 5–8-membered ring constituted of carbon—carbon bonds, and more preferably a cyclic conjugated diene having a 6-membered ring. Specific examples thereof include 1,3-cyclopentadiene, 1,3-cyclohexadiene, 1,3-cycloheptadiene, 1,3-cyclooctadiene and derivatives thereof. Preferred examples are 1,3-cyclohexadiene and derivatives thereof.

$R^{21}$ in the molecular structure unit (C) and the monomer C has the same meaning as $R^1$ in the molecular structure unit (A) and the monomer A. $R^{22}$ has the same meaning as $R^{12}$ in the molecular structure unit (B) and the monomer B.

The following monomers can be given as examples of the monomer C. With these examples of the monomers, the molecular structure unit (C) derived from these monomers C is also given as examples.

[Scheme 68]

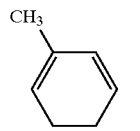

[Scheme 69]

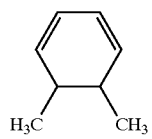

A monomer from which the molecular structure unit (D) derived from a double bond-containing monomer originates is referred to as a monomer D.

In this specification, the double bond-containing monomer means a monomer having a polymerizable double bond. Examples of the double bond-containing monomer include olefin, isoolefin, branched α-olefin, conjugated olefin, cyclic olefin, vinyl ether, cyclic ether and lactone monomers.

The examples also include norbornene and derivatives thereof, compounds having accumulative double bonds; and carbonic acid and carbonic esters having a hydrocarbon group with a terminal double bond.

The olefin monomer is represented by the general formula: $CH_2=CHR$ wherein R represents a hydrogen atom, a non-branched alkyl group having 1–40 carbon atoms, a branched or non-branched aralkyl group having 7–40 carbon atoms, a non-branched alkenyl group having 3–40 carbon atoms, or a halogen atom.

The isoolefin monomer is represented by the general formula: $CH_2=CRR'$ wherein each of R and R' is individually selected from alkyl groups having 12 or less carbon atoms, or having more than 12 carbon atoms. Examples of the alkyl groups are methyl, ethyl, n-propyl, isopropyl and t-propyl groups. Specific examples of the isoolefin monomer include isobutylene, 2-methyl-1-butene, 2-methyl-1-pentene, 2-ethyl-1-butene, 2,3-dimethyl-1-butene, 2,3,3-trimethyl-1-butene and 2,5-dimethyl-1,5-hexadiene.

The branched α-olefin monomer is represented by the general formula: $CH_2=CHR$ wherein R is a branched alkyl (including cycloalkyl) group having 12 or less carbon atoms, or more than 12 carbon atoms. Specific examples thereof include 3-methyl-1-butene, 3-methyl-1-pentene, 4-methyl-1-pentene, 4-methyl-1-hexene, 6-methyl-1-heptene, and allylcyclohexane.

The conjugated olefin monomer is an olefin of conjugated diene or conjugated triene, and includes a linear chain conjugated diene or conjugated triene having 12 or less carbon atoms. Specific examples thereof include butadiene, isoprene, piperylene, 1,4-dimethylbutadiene and trans-2-methyl-1,3-pentadiene.

Examples of the cyclic olefin monomer include β-pyrene, cyclobutene, and cyclopentene.

The alkyl vinyl ether monomer is represented by the general formula: $CH_2=CHOR$ wherein R represents a linear chain, branched or cyclic alkyl or aralkyl group having 12 or less carbon atoms, or more than 12 carbon atoms. Specific examples thereof include methyl vinyl ether, ethyl vinyl ether, n-propyl vinyl ether, n-butyl vinyl ether, isopropyl vinyl ether, iso-butyl vinyl ether, t-butyl vinyl ether, cyclohexyl vinyl ether and benzyl vinyl ether.

The aryl vinyl ether monomer is represented by the general formula: $CH_2=CHOR'$ wherein R' represents a phenyl, substituted phenyl, naphthyl, or substituted naphthyl group. (The substituent in the phenyl or naphthyl group is a lower alkyl group or a halogen atom.) Specific examples thereof include phenyl vinyl ether, para-trivinyl ether and naphthyl vinyl ether.

The substituted vinyl ether monomer is represented by the general formula $CH_2=CHOX$ wherein X represents an alkyl or aryl group having 20 or less carbon atoms and bonded to a heteroatom such as a halogen or silicon atom, or an alkyl or aryl group having 20 or less carbon atoms and containing any functional group of an ether bond, an ester bond and an amino group.

Specific examples thereof include para-anisyl vinyl ether, 2-chloroethyl vinyl ether, $CH_2=CHOCH_2CH_2O_2CCH_3$, $CH_2=CHOCH_2CH_2O_2CC_6H_5$, $CH_2=CHOCH_2CH_2O_2CCH(CH_3)=CH_2$, $CH_2=CHOCH_2CH_2O_2CCH=CH_2$, $CH_2=CHOCH_2CH_2O_2CCH=CHC_6H_5$, $CH_2=CHOCH_2CH_2O_2CCH=CHCH=CHCH_3$, $CH_2=CHOCH_2CH_2OC(CH_2CH_2O)_nC_2H_5$, $CH_2=CHOCH_2CH_2OC_6H_5$, $CH_2=CHOCH_2CH_2CH(CO_2C_2H_5)_2$, $CH_2=CHOCH_2CH_2C(CO_2C_2H_5)_3$, $CH_2=CHOCH_2CH_2C_6H_4\text{-}p\text{-}C_6H_4\text{-}p\text{-}OCH_3$, and $CH_2=CHOCH_2CH_2O(CH_2C_2HO)_nC_6H_4\text{-}p\text{-}C_6H_4\text{-}p\text{-}OCH_3$ The divinyl ether monomer is represented by the general formula: $CH_2=CHOCH=CH_2$ or $CH_2=CHOXOCH=CH_2$ wherein X represents $-(CH_2)_n-$, $-(CH_{12}CH_2O)_nCH_2CH_2-$, $-CH_2CH_2OC(CH_3)_2C_6H_4C(CH_3)_2OCH_2CH_2-$, or the like and n is an integer of 1–12.

The α substituted vinyl ether monomer is represented by the general formula: $CH_2=CR'OR$ wherein R represents a linear, branched or cyclic alkyl group having 12 or less carbon atoms, and R' represents a methyl group, an alkoxyl group having 12 or less carbon atoms, or a chlorine atom. A specific example thereof is an α-methylethyl vinyl ether.

The β substituted vinyl ether monomer is represented by the general formula: $R'CH=CHOR$ wherein R represents a linear, branched or cyclic alkyl group having 12 or less carbon atoms, and R' represents an alkoxyl group having 12 or less carbon atoms, or a chlorine atom. A specific example thereof is a β-methylethyl vinyl ether.

The cyclic ether monomer is oxirane, oxetan, or the like.

The oxirane and epoxide are ones having 12 or less carbon atoms, and may contain a halogen atom. Specific examples thereof include ethylene oxide, propylene oxide, cyclohexene oxide, vinylcyclohexene oxide, norbornene oxide and epichlorohydrin.

The oxetan has 12 or less carbon atoms and may contain a halogen atom. Specific examples thereof include oxetan, 3,3-dimethyloxetan, and 3,3-bis(chloromethyl)oxetan.

As the cyclic ester monomer, lactone can be given.

Examples of the lactone include β-propiolactone, ε-caprolactone, δ-valerolactone, and N-vinylcarbazol and lactone substituted with an alkyl group having 12 or less carbon atoms, such as α,α-dimethyl-β-propiolactone, β-methyl-β-propiolactone, and β,β'-dimethyl-β-propiolactone.

Examples of the aromatic olefin monomer include styrene, para-methoxystyrene, α-methylstyrene, para-methylstyrene, para-isopropylstyrene, ortho-methylstyrene, 2,4-dimethylstyrene, para-dimethylaminostyrene, para-diisopropenylbenzene, ortho-divinylbenzene, indene, 1-methylindene, acenaphthalene, and 2-vinylfluorene.

Some examples of such a double bond-containing monomer will be illustrated. Derivatives of these compounds will also be illustrated at the same time.

[Scheme 70]

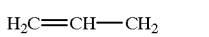

[Scheme 71]

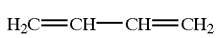

[Scheme 72]

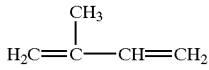

[Scheme 73]

[Scheme 74]

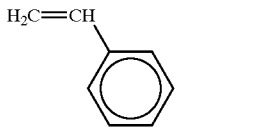

[Scheme 75]

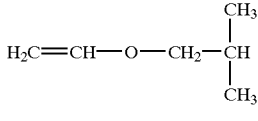

[Scheme 76]

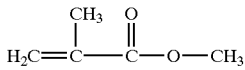

[Scheme 77]

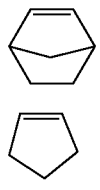

[Scheme 78]

The copolymer of the present invention comprises 2 or more kinds of molecular structure units among the four kinds of those. That is, the combination of the molecular structure units is the following 11 kinds: (A)/(B), (A)/(C), (A)/(D), (B)/(C), (B)/(D), (C)/(D), (A)/(B)/(C), (A)/(B)/(D), (A)/(C)/(D), (B)/(C)/(D) and (A)/(B)/(C)/(D). Two or more molecular structure units may be selected among these molecular structure units.

The copolymers of the present invention may be random copolymers, alternate copolymers, taper block copolymers, graft copolymers, and block copolymers such as diblock, triblock, tetrablock, multi-block and radial block copolymers.

(4) Poly (Cyclic Conjugated Diene) Having a Molecular Structure Unit (C)

The molecular structure unit (C) and the monomer C from which this molecular structure unit (C) originates are the same as described in the above-mentioned item (3). The compound represented by the formula (IV) is the same as described in the (5) described later.

In the polymer composed of the molecular structure units A, the polymer composed of the molecular structure unit (B), the copolymer composed of two or more kinds selected from the molecular structure units (A)–(D), and the polymer composed of the molecular structure unit (C), their number average molecular weight is preferably 5,000 or more. If the molecular weight is less than 5,000, sufficient mechanical properties cannot be obtained. Further, the number average molecular weight is preferably within the range from 5,000 to 5,000,000, more preferably from 20,000 to 1,000,000 and most preferably from 50,000 to 500,000. The number average molecular weight referred to in the present invention is a number average molecular weight of a polymer chain converted to standard polystyrene.

The cyclic diene polymer and the cyclic diene copolymer of the present invention have properties such as excellent heat resistance and rigidity, a small specific gravity and a low dielectric constant. Therefore, in the field of automobile materials, they exhibit properties such as a low specific gravity, and high heat resistance and dimensional stability, as parts inside an engine room, underhood parts, interior and exterior parts, and the like. In the field of electric and electrical materials, they exhibit properties such as a low dielectric constant and high heat resistance, as heat resistant insulating materials, injection stoppers, printed wiring boards, and the like.

In the field of housing and building materials, they exhibit properties such as high weather resistance and heat resistance, as exterior sealing materials, vibration isolating materials, damping materials, elastic paints, elastic adhesive agents, and the like.

In the field of resin modifiers, they are used as modifiers, agents for compatibility or the like, and exhibit properties such as high rigidity, heat resistance, reactivity, and compatibility with polyolefin.

In the field of elastomers, they exhibit high heat resistance and weather resistance as thermoplastic olefin elastomers or the like.

The present invention also provides a novel process for polymerizing a cyclic conjugated diene monomer.

The polymerizing process of the present invention, with respect to the above-mentioned monomers A, B, C and D, is a preferable process for polymerizing the same kind of monomers, and different kinds of monomers. However, the present process is not limited to homopolymerization nor to copolymerization of these monomers, but is a polymerizing process of forming a polymer chain using a mono-component catalyst or a multi-component catalyst, which will be described later, to polymerize these monomers A–D and another polymerizable monomer, or other monomers each other.

The number average molecular weight of the homopolymer of the monomers C each other and the homopolymer of the monomers D each other ranges preferably 5,000 or more, and particularly from 5,000 to 5,000,000, more preferably from 20,000 to 1,000,000, and most preferably from 50,000 to 500,000.

(5) The Present Mono-component Catalyst

The mono-component catalyst in the present invention is represented by the following general formula (IV):
[Scheme 79]

$$[L_nMX_m]^{a+}[A]^{a-} \quad (IV)$$

wherein M represents a transition metal element of the eighth, ninth or tenth group in the periodic table; L represents a ligand against the metal M having 1–3 π bonds; X represents a ligand against the metal M having at least one σ bond and 0–3π bonds; n is 0,1 or 2; m is 0 or 1; both of n and m are not 0 at the same time; when m is 0, a is 2; when m is 1, a is 1; and A represents a counter anion of $[L_nMX_m]^{a+}$.

The present mono-component catalyst is a catalyst which can form a complex having an allyl structure between its transition metal ion and the monomer in the polymerizing system. Such mono-component catalysts are classified into one which forms the complex having an allyl structure by itself and one which is reacted with the monomer to form the complex having an allyl structure.

M represents a metal element of the eighth, ninth or tenth group in the periodic table. Examples thereof include nickel (Ni), palladium (Pd), platinum (Pt), cobalt (Co), iron (Fe), ruthenium (Ru), osmium (Os), rhodium (Rh), and iridium (Ir). Nickel (Ni) and palladium (Pd) are preferred. This catalyst contains one or more transition metal elements. The transition metal elements may be used alone or in combination of two or more kinds, if necessary.

X is preferably a linear or branched alkyl group having 1–10 carbon atoms, a linear or branched alkoxyl group having 1–20 carbon atoms, an aryloxyl group having 6–15 carbon atoms, or an acyclic, monocyclic or polycyclic alkenyl having 3–20 carbon atoms and substituted or non-substituted with a halogen atom.

L is preferably selected from monoolefin having 2–12 carbon atoms, a linear chain or cyclic diolefin having 4–12 carbon atoms and aromatic compounds having 6–20 carbon atoms. L is more preferably selected from 2,3-dimethyl-2-butyne, cyclooctadiene, norbornadiene, and dibenzocyclooctadiene.

L is also preferably selected from cycloalkadiene having 6–12 carbon atoms, norbornadiene, and cyclotriene having 10–20 carbon atoms.

A is preferably an anion which is non-coordinating the cationic complex or weak coordinating the same. A is preferably $BF_4^-$, $PF_6^-$, $AlF_3O_3SCF_3^-$, $SBF_5SO_3F^-$, $AsF_6^-$, $SBF_6^-$, $SBF_5SO_3F^-$, $AsF_6^-$, perfluoroacetic acid ($CF_3CO_2^-$), perfluoropropionic acid ($C_2F_5CO_2^-$), perfluorolactic acid ($CF_3CF_2CF_2CO_2^-$), perchlorate ($ClO_4^-.H_2O$), p-toluene sulfonic acid (p-$CH_3C_6H_4SO_3^-$) and tetraphenyl borate represented by the following scheme 80:

[Scheme 80]

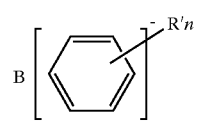

wherein R' each individually represents a hydrogen or fluorine atom, or a trifluoromethyl group, and n is an integer of 1–5.

These mono-component catalysts are in advance synthesized before polymerization. The mono-component catalysts may be used alone or in combination of two or more kinds, if necessary.

Specific examples of the mono-component catalyst include the following compounds:

[Scheme 81]

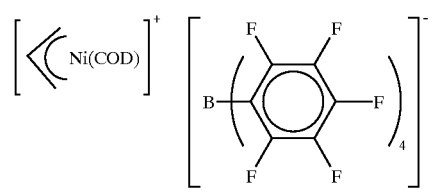

[Scheme 82]

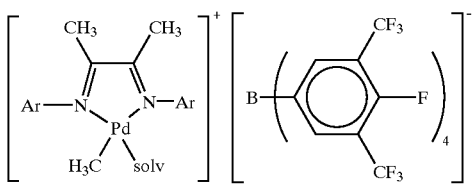

(6) The Present Multi-component Catalyst

The multi-component catalyst in the present invention is a catalyst comprising a transition metal compound (a), an organic aluminum compound (b) and/or an electron donating component (c). Namely, in the multi-component catalyst, there are combinations of the above (a) and (b); (a) and (c); and (a), (b) and (c).

The multi-component catalyst is a catalyst for forming a complex of an allyl structure of a transition metal ion in the multi-component mixture system.

The transition metal element constituting the transition metal compound is preferably iron (Fe), ruthenium (Ru), osmium (Os), cobalt (Co), rhodium (Rh), iridium (Ir), nickel (Ni), palladium (Pd), or platinum (Pt). Nickel (Ni) and palladium (Pd) are more preferred. The transition metal elements may be used alone or in combination of two or more kinds, if necessary.

The transition metal compound is a compound wherein one or more ligands are bonded to such a metal element. The coordination may be a mono, di, or multi-site coordination, and may be an ionic or neutral coordination.

The transition metal compounds may be used alone or in combination of two or more kinds, if necessary.

Preferred examples of the transition metal compound are nickel acetylacetonate, nickel carboxylate, nickel dimethylglyoxime, nickel ethylhexanoate, cobalt neodecanoate, iron naphthanoate, palladium ethylhexanoate, $NiCl_2(PPh_3)_2$, $NiCl_2$ $(PPh_2CH_2)_2$, nickel (II) hexafluoroacetylacetonate tetrahydrate, nickel (II) trifluoroacetylacetonate dihydrate, nickel (II) acetylacetonate tetrahydrate, bisallyl nickel bromide, bisallyl nickel chloride, bisallyl nickel iodide, trans $PdCl_2(PPh_3)_2$, palladium (II) bis(trifluoroacetate), palladium (II) bis(acetylacetonate), palladium (II)$_2$-ethylhexanoate, $Pd(acetate)_2(PPh_3)_2$, palladium (II) bromide, palladium (II) chloride, palladium (II) iodide, palladium (II) oxide, monoacetonitryltris(triphenylphosphine) palladium (II) tetrafluoroborate, tetrakis(acetonitryl) palladium (II) tetrafluoroborate, dichlorobis(acetonitryl) palladium (II), dichlorobis(triphenylphosphine) palladium (II), dichlorobis(benzonitryl) palladium (II), iron (II) chloride, iron (III) chloride, iron (II) bromide, iron (III) bromide, iron (II) acetate, iron (III) acetylacetonate, ferrocene, nickelocene, nickel (II) acetate, nickel bromide, nickel chloride, dichlorohexyl nickel acetate, nickel lactate, nickel oxide, nickel tetrafluoroborate, cobalt (II) acetate, cobalt (II) acetylacetonate, cobalt (III) acetylacetone, cobalt (II) benzoate, cobalt chloride, cobalt bromide, dichlorohexyl cobalt acetate, cobalt (II) stearate, cobalt (II) tetrafluoroborate, bis(allyl) nickel, bis(cyclopentadienyl) nickel, palladium acetylacetonate, palladium bis (acetonitryl) dichloride, palladium bis(dimethylsulfoxide) dichloride, platinum bistriethylphosphinehydro bromide, ruthenium tris(triphenylphosphine) dichloride, ruthenium tris(triphenylphosphine) hydride chloride, ruthenium trichloride, ruthenium tetrakis(acetonitryl) dichloride, ruthenium tetrakis(dimethylsulfoxide) dichloride, rhodium chloride, rhodium tris(triphenylphosphine) trichloride, bis-2,6-diisopropylphenylimino acenaphthalene nickel dichloride, bis-2,6-diisopropylphenylimino acenaphthalene nickel dibromide, bis-2,6-dimethylphenylimino acenaphthalene nickel dibromide, bis-2,6-dimethylphenylimino acenaphthalene nickel dichloride, bis-2,6-diphenylimino acenaphthalene nickel dibromide, bis-2,6-diphenylimino acenaphthalene nickel dichloride, 1,4-bisdiisopropylphenyl-2,3-dimethyldiazabutadiene nickel dibromide, 1,4-bisdiisopropylphenyl-2,3-dimethyldiazabutadiene nickel dichloride, 1,4-bisdimethylphenyl-2,3-dimethyldiazabutadiene nickel dibromide, 1,4-bisdimethylphenyl-2,3-dimethyldiazabutadiene nickel dichloride, 1,4-bisphenyl-2,3-dimethyldiazabutadiene nickel dibromide, 1,4-bisphenyl-2,3-dimethyldiazabutadiene nickel dichloride, 1,4-bisdiisopropylphenyldiazabutadiene nickel dibromide, 1,4-bisdiisopropylphenyldiazabutadiene nickel dichloride, 1,4-bisdimethylphenyldiazabutadiene nickel dibromide, 1,4-bisdimethylphenyldiazabutadiene nickel dichloride, 1,4-bisphenyldiazabutadiene nickel dibromide, 1,4-bisphenyldiazabutadiene nickel dichloride, bipyridyl nickel dibromide, bipyridyl nickel dichloride, phenanthrolyl nickel dibromide, or phenanthrolyl nickel dichloride.

Preferred examples of the organic aluminum compound are trialkyl aluminum, dialkyl aluminum halide, monoalkyl aluminum dihalide, alkyl aluminum sesquihalide, aluminoxamine or mixtures thereof.

Specific examples thereof include trimethyl aluminum, triethyl aluminum, tri-n-propyl aluminum, tri-n-butyl aluminum, triisobutyl aluminum, tri-t-butyl aluminum, triisopropyl aluminum, tripentyl aluminum, tri-n-hexyl aluminum, tri(2-methylpentyl) aluminum, tri-n-octyl aluminum, diethyl aluminum hydride, diisobutyl aluminum hydride, methyl aluminum sesquichloride, isobutyl aluminum sesquichloride, di-t-butyl aluminum chloride, diisopropyl aluminum chloride, dipentyl aluminum chloride, methyl aluminum dichloride, ethyl aluminum dichloride, isobutyl aluminum dichloride, t-butyl aluminum dichloride, isopropyl aluminum dichloride, and pentyl aluminum dichloride.

The aluminoxane is a product obtained by condensing a single kind of trialkyl aluminum and water, and a product obtained by condensing two or more kinds of trialkyl aluminum and water, and is a condensed product in a chain, ring or basket form.

Specific examples thereof include methylaluminoxane, ethylaluminoxane, propylaluminoxane, butylaluminoxane, isobutylaluminoxane, methylethylaluminoxane, methylbutylaluminoxane, and methylisobutylaluminoxane. Methylaluminoxane and methylisobutylaluminoxane are especially preferred.

The electron donating component is specifically a Lewis acid, a Brønsted acid, a halogenated compound or a mixture thereof. It is preferred that the electron donating component is used in the case of using a transition metal compound having a metal element selected from nickel, ruthenium, iron, palladium, cobalt and platinum as a transition metal element.

The Lewis acid is preferably selected from the group consisting of $BF_3$.ethylate, $TiCl_4$, $SbF_5$, $BCl_3$, $B(OCH_2CH_3)$, $SiCl_4$ and tris(perfluorophenyl) boron.

The Brønsted acid is preferably selected from the group consisting of $HSbF_6$, $HPF_6$, $CF_3CO_2H$, $FSO_3H.SbF_5$, $H_2C(SO_2CF_3)_2$, $CF_3SO_3H$ and para-toluene sulfonic acid.

The halogenated compound is preferably selected from the group consisting of hexachloroacetone, hexafluoroacetone, 3-butenic acid-2,2,3,4,4-pentachlorobutyl ester, hexachloroglutalic acid, hexafluoroisopropanol, chloranyl, and mixtures thereof.

With such various types of catalysts, the above-mentioned various kinds of monomers can be polymerized. Further, the catalysts may be applied to other polymerizable monomers. For polymerizing reaction, it is allowable to use any one of slurry, gas phase, bulk, solution and suspension polymerization processes and the like in the presence of the catalyst referred to in the present invention.

Examples of a polymerizing solvent which can be used in the case of solution polymerization in the polymerizing process of the present invention include aliphatic hydrocarbons such as butane, n-pentane, n-hexane, n-octane, iso-octane, n-nonane and n-decane; alicyclic hydrocarbons such as cyclopentane, methylcyclopentane, cyclohexane, methylcyclohexane, ethylcyclohexane, cycloheptane, cyclooctane, decalin and norbornane; aromatic hydrocarbons such as benzene, toluene, xylene, ethylbenzene and cumene; ethers such as diethyl ether and tetrahydrofuran; and aromatic halides such as chlorobenzene, o-dichlorobenzene and 1,2,4-trichlorobenzene.

These polymerizing solvents may be used alone or in a mixed form of two or more kinds.

In the present polymerizing process, while the using amount of the catalyst is not particularly limited, the amount of the metal element generally ranges from $1 \times 10^{-6}$ to $1 \times 1^{-1}$ mole and preferably from $5 \times 10^{-6}$ to $5 \times 10^{-2}$ mole per mole of the monomer.

In the present polymerizing process, the polymerizing temperature is set as necessity requires. Generally it ranges from $-80$ to $120°$ C., preferably from $-30$ to $110°$ C., and more preferably from 0 to $100°$ C.

The atmosphere in the polymerizing system may be an inert atmosphere which is generated by an inert gas such as nitrogen, argon or helium. There are also cases in which the inert atmosphere is not required.

The pressure of the polymerizing system is not particularly limited. In the case of copolymerization with a vinyl monomer, a pressure of 1 or more atmosphere can be applied to a gas monomer such as ethylene, propylene, butadiene or allene.

In the present polymerizing process, the time required for the polymerizing reaction varies in accordance with purposes and polymerizing conditions and thus it cannot particularly be limited. Usually, however, the time is less than 24 hours and may range from 1 to 3 hours.

In conducting the present polymerizing process, various forms of polymers and copolymers can be obtained by means of conventionally known methods. Random copolymers and taper block copolymers may be generally produced by charging two or more kinds of monomers in a polymerizing system in the same manner as in the process of producing homopolymers.

Block copolymers can be produced by adding one kind of monomer into a catalyst solution as being then consumed completely, and then adding the other monomer thereto.

Alternate copolymers can be produced by charging a monomer to be used and carbon monoxide simultaneously.

In the case of obtaining various type copolymers such as random, alternate and block copolymers by the present polymerizing process, the above-mentioned various types of catalysts may be used. However, effective type catalysts are different dependently on the kind of monomer to be polymerized.

There are also cases where preferably an allyl type cationic complex exhibiting catalyst activity in a polymerizing system is preliminarily formed prior to polymerization. In such a case, the cationic complex should be formed before the addition of monomers to be polymerized.

When a binary copolymer using 1,3-cyclohexadiene and norbornene as monomers is produced for example, it is preferable to use the mono-component catalyst and the multi-component catalyst.

When a binary copolymer using 1,3-cyclohexadiene and allene as monomers is produced for example, it is preferable to use the mono-component catalyst.

When a tertiary copolymer using 1,3-cyclohexadiene, allene and norbornene as monomers is produced for example, it is preferable to use the mono-component catalyst is a case of producing.

There are cases where a catalyst acts effectively in accordance with the kind of a transition metal element to be used, whether the one is the mono-component catalyst or the multi-component one.

It is preferred to use Pd as the transition metal element in the case of homopolymerization and copolymerization of a cyclic conjugated diene monomer having a polar group and in the case of homopolymerization and copolymerization of a double bond-containing monomer having a polar group. In such polymerization, Pd catalysts exhibit high polymerization activity. A specific example is polymerization of a tertiary copolymer of 1,3-cyclohexadiene, propylene and methylmethacrylate.

It is also effective to use Ni in the case of cyclic conjugated diene monomers and double bond-containing monomers having, as a polar group, an alkoxyl group or aryloxyl group having a relatively low polarity.

It is preferred to use Ni as the transition metal element in the case of homopolymerization of a cyclic conjugated diene monomer having no polar group, and copolymerization of such a cyclic conjugated diene monomer and a double bond-containing monomer having no polar group. In such polymerization, the Ni catalyst has high activity and high 1,4-positioning selectivity. Obtained polymers mainly have 1,4-positions.

A specific example is copolymerization of 1,3-cyclohexadiene and propylene.

In the present polymerizing process, if necessary, it is allowable to add known terminal modifiers, terminal branching agents, polymerization terminators, polymerization stabilizers, and oxidation stabilizers after the attainment of a determined polymerization degree.

After the polymerizing reaction, further derivatives may be obtained by introducing hydrogen, a halogen atom, an organic functional group or the like into the molecular structure unit.

The resultant polymer can be collected by a solvent-removing operation, a drying operation and the like in conventionally known producing processes of poly(cyclic conjugated diene).

From the above description, the present invention can apply the following embodiments.

1. A poly(cyclic conjugated diene) wherein molecular structure units derived from one or more kinds of monomers selected from cyclic conjugated diene monomers are represented by the molecular structure unit (A) and the molecular structure units are bonded to each other at 1,4-position and/or 1,2-position, the polymer being obtained by using the mono-component catalyst or the multi-component catalyst to polymerize the monomers.

2. A poly(cyclic conjugated diene) wherein molecular structure units derived from one or more kinds of monomers selected from cyclic conjugated diene monomers are represented by the molecular structure unit (B) and the molecular structure unit are bonded to each other at 1,4-position and/or 1,2-position, the polymer being obtained by using the mono-component catalyst or the multi-component catalyst to polymerize the monomers.

3. A poly(cyclic conjugated diene) wherein molecular structure units derived from one or more kinds of monomers selected from cyclic conjugated diene monomers are represented by the molecular structure unit (C) and the molecular structure unit is bonded to each other at 1,4-position and/or 1,2-position, the polymer being obtained by using the mono-component catalyst or the multi-component catalyst to polymerize the monomers.

4. A copolymer comprising two or more kinds of molecular structure units selected from four kinds of molecular structure units:

one or more kinds of the molecular structure unit (A),
one or more kinds of the molecular structure unit (B),
one or more kinds of the molecular structure unit (C), and
the molecular structure unit (D) derived from one or more kinds of monomers selected from monomers containing a double bond,
wherein the molecular structure units (A), (B) and (C) are bonded to its polymer chain at 1,4-position and/or 1,2-position, the polymer being obtained by using the mono-component catalyst or the multi-component catalyst to polymerize the monomers.

5. A process for polymerizing a cyclic conjugated diene monomer, wherein the mono-component catalyst or the multi-component catalyst is used to polymerize the monomer A.

6. A process for polymerizing a cyclic conjugated diene monomer, wherein the mono-component catalyst or the multi-component catalyst is used to polymerize the monomer B.

7. A process for polymerizing a cyclic conjugated diene monomer, wherein the mono-component catalyst or the multi-component catalyst is used to polymerize the monomer C.

8. A process f or polymerizing a cyclic conjugated diene monomer, wherein the mono-component catalyst or the multi-component catalyst is used to polymerize two or more kinds of monomers selected from four kinds of molecular structure units:

one or more kinds of the molecular structure unit (A),
one or more kinds of the molecular structure unit (B),
one or more kinds of the molecular structure unit (C), and
the molecular structure unit (D) derived from one or more kinds of monomers selected from monomers containing a double bond.

Modifying Product of a Poly(Cyclic Conjugated Diene)

The present invention provides a poly(cyclic conjugated diene) comprising a modifying substance selected from hydrogen, halogen, hydrogen halide, sulfuric acid, water, halohydrin, an alkyl group, an aryl group and oxygen, the modifying substance being added to a double bond moiety of the polymer to change the double bond into a single bond.

The double bond of the above-mentioned polymers imparts properties such as reactivity of the polymer, flexibility and affinity with a solvent, but may damage thermal stability and mechanical properties.

Thus, by modifying a part or all of the double bond moieties to be changed into single bond(s), heat resistance, acid resistance and the like of the copolymers can be improved. The double bond moieties, for example, 0.1–100 mole % of the monomer units are saturated.

The modification of the double bond moieties can be conducted by any addition reaction to carbon—carbon double bonds to be carried out by techniques in the prior art. Specific examples of the addition reaction include addition of hydrogen (hydrogenation reaction), addition of a halogen (halogenation reaction), addition of hydrogen halide (halogenation and hydrogenation reaction), addition of sulfuric acid (sulfonation), addition of water (hydration reaction), addition of halohydrin (halohydrination), addition of an alkyl group (alkylation), addition of an aryl group (arylation), and addition of oxygen or a hydroxyl group (oxidization reaction).

For example, it is preferred that hydrogen is added to at least one of the double bonds of the polymer. This leads to addition of hydrogen to at least one part of double bonds to be changed into single bond(s). As a hydrogenated product, a hydrogenated product of a poly(cyclic conjugated diene) can be obtained wherein hydrogen is added to at least one part of the above-mentioned copolymer.

When hydrogen is added to a part or all of cyclic conjugated diene in the copolymer in this way, the heat resistance, the anti-oxidation and the like of the copolymer can be improved.

The double bond to which hydrogen is added is either one of a double bond in the cyclic structure represented by the formula (I), (II) or (III); or a double bond in the double bond containing monomer, in the copolymer. Hydrogen may be added to both of the double bond in the cyclic structure represented by the formula (I), (II) or (III) and the double bond in the double bond containing monomer.

A process for the hydrogenation is, for example, a process for hydrogenation of a poly(cyclic conjugated diene) wherein a hydrogen gas is added to a poly(cyclic conjugated diene) obtained by the above-mentioned polymerizing process with hydrogenation catalyst, as shown in, the following scheme 83.

[Scheme 83]

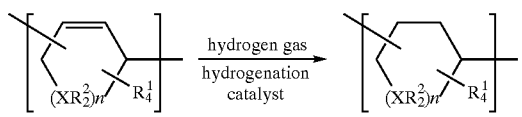

The added amount of hydrogen to the poly(cyclic conjugated diene) can be controlled by a gas pressure of hydrogen, reaction temperature at the time of hydrogenation, a type of a reaction solvent or a hydrogenation catalyst, and the like. Namely, the amount can be controlled within the range from several % to 100% by weight with respect to the copolymer. By this control of the added amount of hydrogen, desired physical properties can be obtained.

The hydrogenated moiety in the copolymer can also be controlled by a gas pressure of hydrogen, reaction temperature at the time of hydrogenation, a type of a reaction solvent or a hydrogenation catalyst, and the like. For example, in the case of the copolymer of the above-mentioned cyclic conjugated diene and a linear conjugated diene such as butadiene as shown in the following reaction scheme 84, only the unit originating from the linear conjugated diene can be selectively hydrogenated.

[Scheme 84]

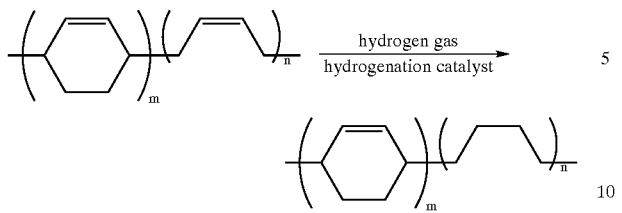

Examples of the above-mentioned hydrogenating catalyst include compounds containing a metal such as titanium, zirconium, hafnium, chromium, molybdenum, tungsten, manganese, rhenium, iron, cobalt, nickel, ruthenium, rhodium, palladium, osmium, iridium, platinum, lanthanum, cerium, praseodymium, neodium, promethium, samarium, europium, gadolinium, terbium, dysprosium, holmium, erbium, thulium, ytterbium, and lutetium, and preferably compounds containing titanium, zirconium, hafnium, rhenium, cobalt, nickel, ruthenium, rhodium, palladium, cerium, neodium, samarium, europium, gadolinium and ytterbium.

Addition of a Basic Compound to a Solvent

When the polymerizing reaction of the cyclic conjugated diene monomer is conducted in a non-polar solvent such as toluene, a polymer is generally obtained in a high yield of 60% or more. However, the polymer may not be produced quantitatively (about 100%).

Thus, it is preferred that the polymerizing reaction is conducted in a non-polar solvent containing a basic compound. This causes great improvement in a polymerizing speed and a yield of the polymer.

The weight ratio of the basic compound to the non-polar solvent preferably ranges from 1/500 to 1/100. When the ratio is less than 1/500, the polymer cannot be quantitatively obtained, to result in a low yield. When the ratio is over 1/100, the catalyst is deactivated so that the polymer is obtained only in a low yield.

The weight ratio of the basic compound to the non-polar solvent more preferably ranges from 1/400 to 1/150, and most preferably ranges from 1/300 to 1/200.

In general, as shown in the following scheme 85, the catalyst of the polymerizing reaction has a polymer chain and a metal (M) at the active center of its growth end. Basic compounds (for example, tetrahydrofuran, which may be referred to as THF) have capability of approaching the metal (M) at the active center of the catalyst to coordinate the metal, and this capability is higher than coordinating-capability of double bonds of the cyclic conjugated diene monomer. Therefore, when the amount of the basic compound is remarkably large, the monomer cannot coordinate the metal so that polymerization is not liable to advance. However, when the added amount of the basic compound is adequate, the stability of the catalyst is improved. Accordingly, it is considered that the life span of the catalyst is prolonged and a polymerizing yield is improved.

[Scheme 85]

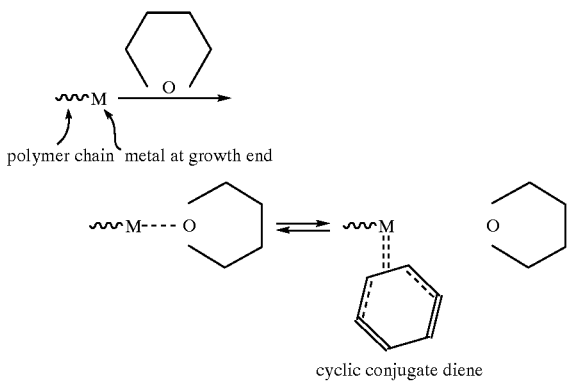

The basic compound is considered to be effective for stabilization of the catalyst, particularly in a multi-component catalyst system wherein an active species is produced in situ. In a mono-component catalyst, its ligand already has a stabilizing effect.

If the above-mentioned effect mechanism is proper, it is presumed that the basic compound exhibits a yield-raising effect of raising a yield in the case of not only polymerization of the cyclic conjugated diene but also polymerization of other monomers, and that the optimal added amounts of the basic compounds are different in accordance with difference in their basic strength.

The basic compound is preferably THF, since THF among the basic compounds especially leads to the improvement in the yield of the polymer.

Examples of the basic compound that can be used in addition to THF include dimethyl ether, diethyl ether, dipropyl ether, 2-methyltetrahydrofuran, tetrahydropyrane, 1,3-dioxane, 1,4-dioxane, 1,3,5-trioxane, and 2,6-dimethylpyridine.

Aromatic Halide Solvent

The above-mentioned polymerizing reaction is preferably conducted in an aromatic halide. This leads to the improvement in a polymerizing speed and a polymerizing yield.

Preferably, the aromatic halide is, for example, chlorobenzene or o-dichlorobenzene since a polymerizing yield is especially improved. Other examples of the aromatic halide that can be used include bromobenzene, 1,2-dibromobenzene, 1,2,3-trichlorobenzene, and 1,2,4-trichlorobenzene.

Pd-based Catalyst

A Pd-based catalyst is preferably used to polymerize a cyclic conjugated diene, or a cyclic conjugated diene and a double bond-containing monomer. This enables the polymerizing reaction to advance even in the presence of water or oxygen. Thus, the cyclic conjugated diene monomer can be polymerized by suspension or emulsion polymerization methods.

Poly(Cyclic Conjugated Diene) Having High Crystallizability

A Ni-based catalyst is used to raise the position- and stereo-regularity of the poly(cyclic conjugated diene), resulting in a raised crystallizability.

A crystalline poly(cyclic conjugated diene) (specifically, poly(1,3-cyclohexadiene)) is characterized in, as shown in FIG. 1, that a single peak is observed within each of ranges: $2\theta=16.5-16.9°$, $19.3-19.7°$, and $22.3-22.7°$ (the total number of the peaks is three) in a wide-angle X ray diffraction spectrum (an X ray source: Cu—K$\alpha$).

Figure 2:
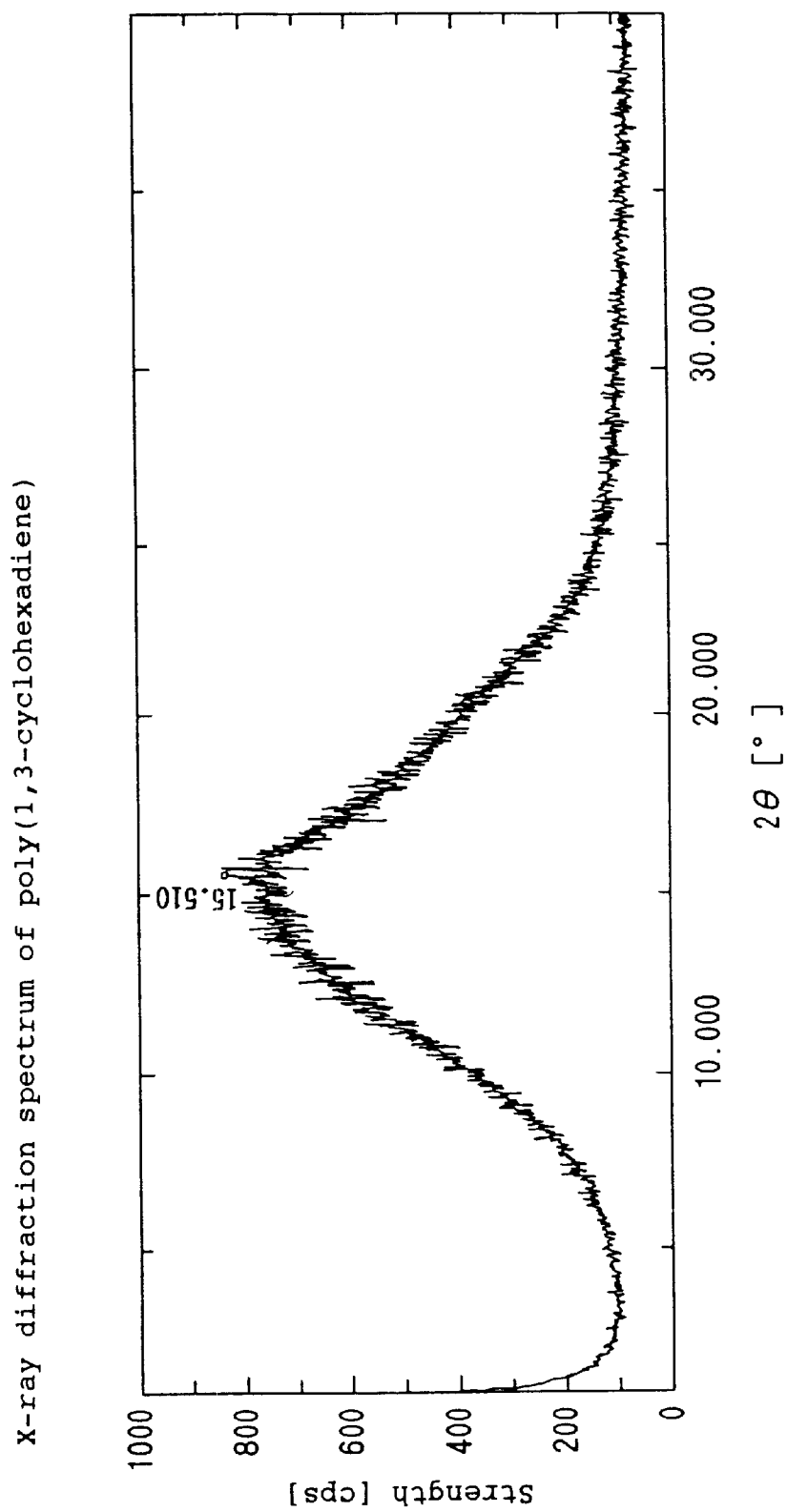
FIG. 2 is a graphical representation showing an X-ray spectrum of an amorphous poly(1,3-cyclohexadiene).

In the meantime, an X-ray diffraction spectrum of an amorphous poly(cyclic conjugated diene)shows a halo within a wide range, as shown in FIG. 2.

Poly(cyclic conjugated diene) having high crystallizability have physical properties of particularly high strength and high heat resistance.

The poly(cyclic conjugated diene) having high crystallizability are particularly suitable for uses such as interior parts of an engine room, underhood parts and heat-resistant insulating materials.

The above-mentioned poly(cyclic conjugated diene) having high crystallizability is produced by, for example, a process for polymerizing a cyclic conjugated diene monomer wherein a Ni-based catalyst is used to polymerize the cyclic conjugated diene monomer, or the cyclic conjugated diene monomer and a double bond-containing monomer. Since the Ni-based catalyst is used for the polymerizing reaction, the poly(cyclic conjugated diene) having high crystallizability can be obtained.

The Ni-based catalyst comprises preferably a compound represented by the following formula (IVA):
[Scheme 86]

$$[L_nNiX_m]^{a+}[A]^{a-} \qquad (IVA)$$

wherein L represents a ligand having 1–3π bonds; X represents a ligand having at least one σ bond and 0–3π bonds; n is 0,1 or 2; m is 0 or 1; both of n and m are not 0 at the same time; when m is 0, a is 2; when m is 1, a is 1; and A represents a counter anion of $[L_nNiX_m]^{a+}$, or a multi-component catalyst containing:
(a) a Ni compound,
(b) an organic aluminum compound, and/or
(c) an electron donating component. Such a Ni catalyst allows a cyclic conjugated diene monomer to be effectively polymerized, so that the resultant polymer has high crystallizability.

There is also a poly(cyclic conjugated diene), which is obtained by the above-mentioned process for polymerizing a cyclic conjugated diene monomer, wherein a single peak is observed within each of ranges: 2θ=16.5–16.9°, 19.3–19.7°, and 22.3–22.7° (the total number of the peaks is three) in a wide-angle X ray diffraction spectrum (an X ray source: Cu—Kα).

This polymer also has high crystallizability as described above.

As the Ni compounds of the multi-component catalyst, the following can be preferably used: nickel acetylacetonate, nickel carboxylate, nickel dimethylglyoxime, nickel ethylhexanoate, $NiCl_2(PPh_3)_2$, $NiCl_2(PPh_2CH_2)_2$, nickel (II) hexafluoroacetylacetonate tetrahydrate, nickel (II) trifluoroacetylacetonate dihydrate, nickel (II) acetylacetonate tetrahydrate, bisallyl nickel bromide, bisallyl nickel chloride, bisallyl nickel iodide, nickelocene, nickel (II) acetate, nickel bromide, nickel chloride, dichlorohexyl nickel acetate, nickel lactate, nickel oxide, nickel tetrafluoroborate, bis(allyl) nickel, bis(cyclopentadienyl) nickel, bis-2,6-diisopropylphenylimino acenaphthalene nickel dichloride, bis-2,6-diisopropylphenylimino acenaphthalene nickel dibromide, bis-2,6-dimethylphenylimino acenaphthalene nickel dichloride, bis-2,6-diphenylimino acenaphthalene nickel dibromide, bis-2,6-diphenylimino acenaphthalene nickel dichloride, 1,4-bisdiisopropylphenyl-2,3-dimethyldiazabutadiene nickel dibromide, 1,4-bisdiisopropylphenyl-2,3-dimethyldiazabutadiene nickel dichloride, 1,4-bisdimethylphenyl-2,3-dimethyldiazabutadiene nickel dibromide, 1,4-bisdimethylphenyl-2,3-dimethyldiazabutadiene nickel dichloride, 1,4-bisphenyl-2,3-dimethyldiazabutadiene nickel dibromide, 1,4-bisphenyl-2,3-dimethyldiazabutadiene nickel dichloride, 1,4-bisdiisopropylphenyldiazabutadiene nickel dibromide, 1,4-bisdiisopropylphenyldiazabutadiene nickel dichloride, 1,4-bisdimethylphenyldiazabutadiene nickel dibromide, 1,4-bisdimethylphenyldiazabutadiene nickel dichloride, 1,4-bisphenyldiazabutadiene nickel dibromide, 1,4-bisphenyldiazabutadiene nickel dichloride, bipyridyl nickel dibromide, bipyridyl nickel dichloride, phenanthrolyl nickel dibromide, phenanthrolyl nickel dichloride or the like.

The Ni compounds not only enable polymers having high crystallizability to be generated, but also have high catalyst activity and a high polymerizing yield.

Concerning the starting materials comprising the above-mentioned cyclic conjugated diene monomer and the double bond-containing monomer, A, L and X in the mono-component catalyst represented by the formula (IVA), and the components (b) and (c) in the multi-component catalyst, the same as used in the process for polymerizing the above-mentioned cyclic conjugated diene monomer can be used.

Poly(Cyclic Conjugated Diene) Comprising Phenylene

There is a poly(cyclic conjugated diene) comprising phenylene produced by using a poly(cyclic conjugated diene) as a precursor, namely, a poly(cyclic conjugated diene) comprising phenylene comprising a phenylene homopolymer or a copolymer of a phenylene and a double bond-containing monomer, wherein the phenylene units are bonded to each other at 1,4-position.

In this phenylene polymer, since the phenylene molecular structure units are bonded to each other in a linear form at 1,4-position, bends or folds are few. Thus, the polymer is excellent in conductivity.

The double bond-containing monomer is preferably one or more kinds of compounds selected from the group consisting of the compounds listed in the above item (3), for example, olefin monomers, branched a-olefin monomers, conjugated olefin monomers, cyclic olefin monomers, norbornene and derivatives thereof, and compounds containing accumulative double bonds. These monomers containing a double bond are easily polymerized with a cyclohexadiene derivative by producing processes described later. Thus, a poly(cyclic conjugated diene) comprising phenylene including these monomers containing a double bond as a structure unit (C) can easily be obtained.

The poly(cyclic conjugated diene) comprising phenylene is suitable for a conductive material. Particularly, block copolymers with a double bond-containing monomer are excepted to have high compatibility with homopolymers of the double bond-containing monomer. Consequently, it is possible to impart conductivity to such resin materials.

As a process for producing a poly(cyclic conjugated diene) comprising phenylene, there is provided, for example, a process comprising the steps of:

preparing a polymer by polymerizing a cyclohexadiene derivative whose molecular structure is represented by the formula (V),

[Scheme 87]

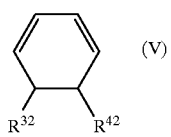

wherein $R^{32}$ and $R^{42}$ are each individually selected from a hydroxyl group, —O(CO)—R wherein R represents an alkyl group, or trialkylsiloxy group wherein three alkyl groups are the same or different kinds, or the cyclohexadiene derivative and a double bond-containing monomer;

under the catalytic activity of a compound represented by the following formula (IV):

[Scheme 88]

$$[L_nMX_m]^{a+}[A]^{a-} \quad (IV)$$

wherein M represents a transition metal element of the eighth, ninth or tenth group in the periodic table; L represents a ligand having 1–3π bonds; X represents a ligand having at least one σ bond and 0–3π bonds; n is 0,1 or 2; m is 0 or 1; both of n and m are not 0 at the same time; when m is 0, a is 2; when m is 1, a is 1; and A represents a counter anion of $[L_nNiX_m]^{a+}$, or a multi-component catalyst containing:

(a) a transition metal compound of a transition metal element of the eighth, ninth or tenth group in the periodic table, and (b) an organic aluminum compound, and/or (c) an electron donating component: and converting the cyclohexadiene derivative of the polymer into paraphenylene by removing the substituents from the cyclohexadiene derivative of the polymer.

As shown in the following scheme, when the above-mentioned polymerizing catalyst in the process for producing this phenylene polymer is used, it is possible to obtain a polymer having high position- and stereo-regularity in the moiety of the cyclohexadiene derivative. The polymer having high position- and stereo-regularity has a remarkably high conversion ratio to phenylene. The phenylene polymer has a shape in which the monomers are bonded in a linear form so that bends of the molecular thereof are few, since the phenylene molecular structure units of the phenylene polymer are bonded at 1,4-position.

[Scheme 89]

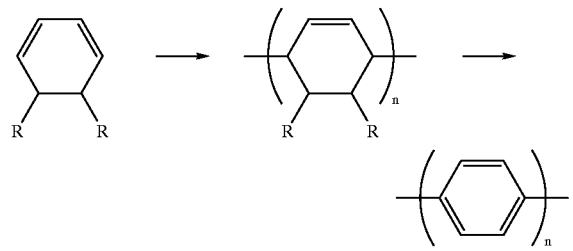

Such a characteristic means that the phenylene polymer has a few "detects" which prevent conductivity. Therefore, the phenylene polymer obtained by the above-mentioned producing process is excellent in conductivity.

Examples of the cyclohexadiene derivatives include 5,6-bishydroxy-1,3-cyclohexadiene, 5,6-bisacetoxy-1,3-cyclohexadiene, and 5,6-bis(trimethylsiloxy)-1,3-cyclohexadiene.

As the double bond-containing monomer, the same monomer as described concerning the copolymer are usable.

The double bond-containing monomer is preferably one or more kinds of compounds selected from the group consisting of the compounds listed in the above item (3), for example, olefin monomers, branched α-olefin monomers, conjugated olefin monomers, cyclic olefin monomers, nor-bornene and derivatives thereof, and compounds containing accumulative double bonds.

Nickel-based catalysts are particularly preferred among the above-mentioned catalysts since they have high position- and stereo-regularity. These Ni-based catalysts have very high activity onto polymerizing reaction of such a double bond-containing monomer and a cyclohexadiene derivative. Thus, a block copolymer of the double bond-containing monomer and the cyclohexadiene derivative can be produced in a high yield.

Such a Ni-based catalyst may be the above-mentioned mono-component catalyst or the multi-component catalyst. In the mono-component catalyst, M in the compound represented by the formula (IV) is Ni. In the multi-component catalyst, the component (a) is a Ni compound.

As the Ni compound in the multi-component catalyst, the following can be preferably used: nickel acetylacetonate, nickel carboxylate, nickel dimethylglyoxime, nickel ethylhexanoate, $NiCl_2(PPh_3)_2$, $NiCl_2(PPh_2CH_2)_2$, nickel (II) hexafluoroacetylacetonate tetrahydrate, nickel (II) trifluoro-acetylacetonate dihydrate, nickel (II) acetylacetonate tetrahydrate, bisallyl nickel bromide, bisally nickel chloride, bisallyl nickel iodide, nickelocene, nickel (II) acetate, nickel bromide, nickel chloride, dichlorohexyl nickel acetate, nickel lactate, nickel oxide, nickel tetrafluoroborate, bis (allyl) nickel, bis(cyclopentadienyl) nickel, bis-2,6-diisopropylphenylimino acenaphthalene nickel dichloride, bis-2,6-diisopropylphenylimino acenaphthalene nickel dibromide, bis-2,6-dimethylphenylimino acenaphthalene nickel dibromide, bis-2,6-dimethylphenylimino acenaphthalene nickel dichloride, bis-2,6-diphenylimino acenaphthalene nickel dibromide, bis-2,6-diphenylimino acenaphthalene nickel dichloride, 1,4-bisdiisopropylphenyl-2,3-dimethyldiazabutadiene nickel dibromide, 1,4-bisdiisopropylphenyl-2,3-dimethyldiazabutadiene nickel dichloride, 1,4-bisdimethylphenyl-2,3-dimethyldiazabutadiene nickel dibromide, 1,4-bisdimethylphenyl-2,3-dimethyldiazabutadiene nickel dichloride, 1,4-bisphenyl-2,3-dimethyldiazabutadiene nickel dibromide, 1,4-bisphenyl-2,3-dimethyldiazabutadiene nickel dichloride, 1,4-bisdiisopropylphenyldiazabutadiene nickel dibromide, 1,4-bisdiisopropylphenyldiazabutadiene nickel dichloride, 1,4-bisdimethylphenyldiazabutadiene nickel dibromide, 1,4-bisdimethylphenyldiazabutadiene nickel dichloride, 1,4-bisphenyldiazabutadiene nickel dibromide, 1,4-bisphenyldiazabutadiene nickel dichloride, bipyridyl nickel dibromide, bipyridyl nickel dichloride, phenanthrolyl nickel dibromide, or phenanthrolyl nickel dichloride.

These Ni compounds not only enable a polymer having high crystallizability to be generated, but also have high catalyst activity and a high polymerizing yield.

Concerning the mono-component catalyst and the multi-component catalyst represented by the formula (IVA), the same as used in the above-mentioned process for producing a cyclic conjugated diene monomer can be used.

After obtaining a polymer by polymerizing a cyclohexadiene derivative or the like, it is preferred to perform the step of converting substituents in the molecular structure unit of the cyclohexadiene derivative in the polymer, if necessary. In the case that the product after the polymerization has substituents that are not liable to be removed, the substituents can easily be removed by such a converting step, leading to an improved yield of the phenylene polymer. Substituents resulting from the conversion are not particularly limited as long as they can easily be removed. Examples thereof include an acetoxy group and a hydroxyl group.

After the polymer is obtained and optionally the converting step is performed as described above, the substituents in the cyclohexadiene derivative moiety of the polymer are removed. A method for such removal is, for example, a heating method.

Embodiments

The following will specifically describe the present invention by way of Adjustment examples of catalysts, Examples (Production examples of polymers) and Comparative Examples.

(1) Processes for producing poly(cyclic conjugated diene): Adjustment examples of catalysts A to J, Examples 1 to 17 and Comparative Example 1.
(2) Hydrogenation of poly(cyclic conjugated diene): Adjustment examples a to f of poly(cyclic conjugated diene) as precursors, and Examples 18 to 27.
(3) Processes for polymerizing cyclic conjugated diene monomers in the presence of basic compounds: Examples 28 to 32, and Comparative Examples 2 to 4.
(4) Processes for polymerizing cyclic conjugated diene monomers in aromatic halide solvents: Examples 33 to 40 and Comparative Examples 5 and 6.
(5) Processes for producing poly(cyclic conjugated diene) having high crystallizability: Examples 41 to 51, and Comparative Examples 7 to 9.
(6) Processes for producing a poly(cyclic conjugated diene) comprising phenylene: Examples 52 to 57.

The scope of the present invention should not be interpreted to be limited to these examples. The following Adjustment examples of catalysts and Examples were carried out, using a glove box or a high vacuum line under an argon atmosphere, unless otherwise specified. All reagents (raw materials of the catalysts, solvents for synthesis and polymerization, monomers and the like) were used after sufficient removal of water and oxygen in a conventional manner.

(1) Processes for Producing Poly(Cyclic Conjugated Diene):
[Adjustment Example of Catalyst A]
(Synthesis of [(η$^3$-crotyl)(cycloocta-1,5-diene)nickel] tetrakis(3,5-bis(trifluoromethyl)borate)

50 g (170 mmol) of 3,5-bis(trifluoromethyl) bromobenzene was dissolved into 150 ml of dimethyl ether, and the resultant solution was slowly added to magnesium powder (5.1 g, 210 mmol) over about 2 hours. Thereafter, the resultant was refluxed for about 3 hours to obtain a dark gray solution.

Sodium tetrafluoroborate (3.4 g, 30 mmol) was added to this solution, and the resultant slurry was refluxed for 24 hours. This reacting solution was added to an aqueous calcium carbonate (wherein 75 g of calcium carbonate was dissolved into 1 liter of water) and then the mixture was stirred for 20 minutes and filtered. The aqueous layer was separated and extracted with 200 ml of diethyl ether 4 times. The ether layers were combined therewith, dried over sodium sulfate, and treated with activated carbon. The solvent was removed under a highly reduced pressure to obtain an amber slush. Methylene chloride was added thereto so as to moisten the whole of the slush, and thereafter, chloroform was added thereto and the remaining solid was filtered and dried.

The collected solid, namely, sodium bis(trifluoromethyl) phenylborate (18 g) was a light yellowish brown, crystalline solid.

A solution wherein cyclooctadiene (1.3 ml) was dissolved into tetrahydrofuran (16 ml) was added to crotyl nickel bromide (0.5 g, 1.75mmol). This mixture was cooled too 0° C., and thereto was added the above-mentioned sodium bis(trifluoromethyl)phenylborate (3.1 g, 3.5 mmol). This mixture was heated to room temperature and stirred for 1 hour to obtain a transparent, dark brown solution. The solvent was removed from this solution under a reduced pressure and then methylene chloride was added thereto so as to obtain a slightly turbid solution. This solution was filtered to obtain a transparent, amber filtrate. The solvent was removed under a reduced pressure and then the resultant was washed by hexane 3 times, then filtered, and dried under a highly reduced pressure to obtain [(η$^3$-crotyl)-(cycloocta-1,5-diene)nickel] tetrakis(3,5-bis(trifluorophenyl)borate) (3.42 g). This compound was yellowish white. This compound is represented by the following scheme 90:

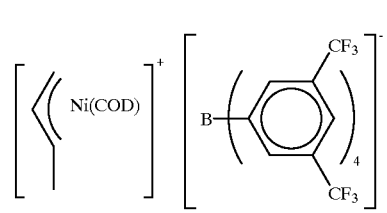

[Scheme 90]

[Adjustment Example of Catalyst B]
(Synthesis of a Dimer of Bisallyl Nickel Bromide)

Allyl bromide (1.21 g, 10 mmol) and 2.5 g of butadiene dissolved into 24 ml of toluene were added to a flask into which bis(cycloocta-1,5-diene)nickel (2.75 g, 10 mmol) was charged, to obtain a dark red dimer of bisallyl nickel bromide.

[Adjustment Example of Catalyst C]
(Synthesis of [(η$^3$-crotyl)(cycloocta-1,5-diene)nickel] hexafluorophosphate)

Crotyl bromide (1.35 g, 10 mmol) and 2.5 g of butadiene dissolved into 24 ml of toluene were added to a flask into which bis(cycloocta-1,5-diene)nickel (2.75 g, 10 mmol) was charged, to obtain a dark red dimer of crotyl bromide. The reactant was allowed to stand at room temperature for 2 hours and then the solvent was removed therefrom under a reduced pressure. To the resultant powder was added a solution wherein 3.6 ml of 1,5-cyclooctadiene was dissolved into tetrahydrofuran (32 ml), and then the solution was cooled to 0° C. Thallium hexafluorophosphate (3.5 g, 10 mmol) was added to this blend solution, and thereafter, the blend solution was heated to room temperature and stirred for 1 hour.

The solvent was removed from this blend solution under a reduced pressure, and then 24 ml of dichloromethane was added thereto. This solution was filtered under a nitrogen atmosphere to remove insoluble thallium bromide, and thus a dichloromethane solution was obtained. After reducing the volume of this solution, diethyl ether was added thereto so as to obtain [(η$^3$-crotyl)(cycloocta-1,5-diene)nickel] hexafluorophosphate (1.3 g) (an orange crystal). This compound is represented by the following scheme 91:

[Scheme 91]

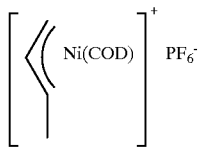

[Adjustment Example of Catalyst D]

Nickel ethylhexanoate (8%wt Ni/mineral water, 0.08 ml, 0.1 mmol) was put into a dry 10 ml glass vial into which nitrogen was charged and a magnetic stirring bar was put. Into this vial was added dimethylanilinium tetrakisperfluorophenylborate (0.1 mmol) dissolved into 2 ml of 1,2-dichloromethane, to obtain a catalyst solution. The catalyst solution thus obtained was stirred at room temperature for 5 minutes before used.

[Adjustment Example of Catalyst E]

Hexafluoroantimonic acid ($HSbF_6$, 0.024 g, 0.1 mmol) was put into a dry 10 ml Teflon bottle which had a Teflon lid and a valve and into which nitrogen was charged and a magnetic stirring bar was put. This bottle was cooled in alcohol and dry ice, and then nickel ethylhexanoate (8%wt, Ni/mineral water, 0.08 ml, 0.1 mmol) was added thereto. The content was heated to room temperature to adjust a catalyst solution.

[Adjustment Example of Catalyst F]

(Synthesis of bis-2,6-diisopropylphenylimino acenaphthalene nickel dibromide)

Initially, the method disclosed in van Asselt et al., Recl. Trav. Chim. Pays-Bas 113, 88–98 (1994) was performed to obtain bis-2,6-diisopropylphenyl-imino-acenaphthelene, which was a ligand, as a light orange crystal.

Into a clean and dry 25 ml Kjeldahl flask which a magnetic stirring bar was put into, were added (1,2-dimethoxyethane)nickel dibromide (0.44 g, 2.0 mmol) dissolved into 5 ml of dichloromethane and the above-mentioned ligand (1.0 g, 2.0 mmol) dissolved into 5 ml of dichloromethane.

This blend solution was stirred at room temperature for 30 minutes. During this time, any evident reaction did not arise. Almost all of dichloromethane (total amount: 10 ml) were removed under a reduced pressure, and then 10 ml of 1,2-dimethoxy ethane were added thereto. A reaction immediately arose, as being confirmed by change of color tone of the solution into a dark red color. After 60 minutes, the reacting solution was heated at 50° C. for 15 minutes to complete the reaction. Thereafter, the solvent was removed, and the remaining solid was dissolved into 1,2-dichloroethane, and then the solution was filtered to obtain a dark red solution. The solvent was further removed and subsequently the flask was transferred to a drying machine, and dried to obtain a solid. This solid was identified as bis-2,6-diisopropylphenylimino acenaphthalene nickel dibromide. This compound is represented in the following scheme 92.

[Scheme 92]

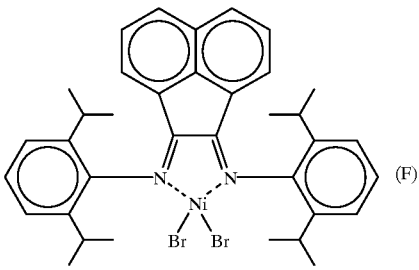

(F)

[Adjustment Example of Catalyst G]

(Synthesis of [($\eta^3$-crotyl)(cycloocta-1,2-diene)-palladium] hexafluorophosphate)

In an Erlenmeyer flask of 500 ml capacity, were added 2.95 g of sodium chloride (50.4 mmol), 4.44 g of palladium chloride (25.3 mmol), 150 ml of methanol and 2.25 g (125 mmol) of water. The suspension solution was stirred at room temperature for 1 hour to obtain a dark brown solution. To this solution was added 7.6 ml (74 mmol) of crotyl bromide.

Thereafter, this solution was washed by carbon monoxide in an amount of 40 ml per minute for 30 minutes. After several minutes, the color of the solution was changed into a light color and simultaneously a precipitate was produced in a considerable amount. This solution was poured into 1 liter of water, so as to obtain a solid having a color between amber and brown colors. This blend solution was subjected to extraction 3 times with chloroform of the total amount of 500 ml. Chloroform was removed from the extracted solution to obtain a yellowish green color solid. Proton NMR demonstrated that this compound was a dimer of ($\eta^3$-crotyl) palladium halide.

This yellowish green solid was dissolved into 100 ml of tetrahydrofuran, and then 1,5-cyclooctanadiene was added thereto. Into tetrahydrofuran was added 8.8 g (25.3 mmol) of thallium hexafluorophosphate. These two solutions were cooled to 0° C. The thallium hexafluorophosphate solution was slowly added to the solution of the palladium compound, so that a light yellowish white precipitate was immediately observed. The amount thereof increased in accordance with the added amount of the thallium solution.

After completing the addition of the solution of the thallium compound, the ice bath was removed and the resultant suspension solution was heated to room temperature while being stirred. THF was removed under a reduced pressure, and then 100 ml of dichloromethane was added thereto. This blend solution was filtered and then concentrated into about 40 ml. 100 ml of diethyl ether was added to this solution to obtain a light yellowish white crystal. This crystal was identified as [($\eta^3$-crotyl)(cycloocta-1,5-diene)-palladium] hexafluorophosphate. This compound is represented in the following scheme 93.

[Scheme 93]

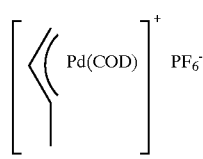

[Adjustment Example of Catalyst H]
(Synthesis of [6-methoxynorbornene-2-yl-5-palladium (cycloocta-1,5-diene)]hexafluorophosphate)

Into a flask into which 1.0 g (3.7 mmol) of (norbornadiene) palladium dichloride and 2 0 ml of methanol were put, was added 0.256 g (3.65 mmol) of potassium methoxide dissolved into 20 ml of methanol, at −78° C. The flask was allowed to stand at the even temperature for one hour, and subsequently the blend solution was heated to room temperature, then filtered and dried to obtain a light green/brown solid (a dimer of methoxynorborneyl palladium chloride). A part of this substance was put into a flask wherein a blend solution of 50 ml of THF and 2 ml of cyclooctadiene was stirred. Thereafter, into this flask was added a solution wherein 0.57 g (1.65 mmol) of thallium hexafluorophosphate were dissolved into 17 ml of THF, at 0° C. The blend solution in this flask was heated to room temperature. The solvent was then removed, and 60 ml of 1,2-dichloroethane was added thereto so as to obtain a yellow solution and a precipitate of lightly colored thallium chloride. This solution was filtered and then the solvent was removed under a highly reduced pressure to obtain a green solid catalyst. This catalyst was identified as [6-methoxynorbornenyl palladium (cyclooctadiene)] hexafluorophosphate. This compound is represented by the scheme 94.

[Scheme 94]

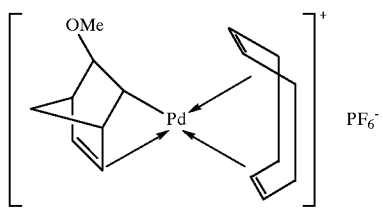

[Adjustment Example of Catalyst I]
(Synthesis of ($\eta^3$-allyl palladium)$^+$SbF$_6^-$)

A slurry wherein a dimer (0.1 mmol) of $\eta^3$-allyl palladium chloride was dissolved into 1 ml of dichloroethane was added to a slurry wherein silver hexafluoroantimonate (0.1 mmol) was dissolved into 1 ml of dichloroethane. The blend slurry was stirred for 20 minutes. The precipitated silver chloride was filtered through a micropore syringe filter and removed to obtain a dichloroethane solution of the catalyst I.

[Adjustment Example of Catalyst J]

A catalyst J, which is represented by the scheme 82, was synthesized according to the method described in J. Am. Chem. Soc. 118(1996), pp. 267–268.

EXAMPLE 1

The catalyst A (109 mg, 0.1 mmol) previously synthesized was dissolved into 15 ml of toluene at room temperature under an argon atmosphere in a glove box, to adjust a catalyst solution. In the meantime, 1,3-cyclohexadiene (8 g, 0.1 mol) which is a cyclic conjugated diene monomer was dissolved into 15 ml of toluene at room temperature under an argon atmosphere in a glove box. While this solution was kept to room temperature and was stirred, the total amount thereof was added to the total amount of the above-mentioned catalyst solution. Polymerization advanced promptly so that a powdery polymer was precipitated from the toluene solution. The polymerizing reaction finished within 30 minutes. A slurry containing the produced polymer was taken out from the glove box, and then was added to a great deal of methanol acidified with hydrochloric acid to precipitate and isolate the polymer. Methanol was then removed by filtration. The resultant was vacuum-dried at room temperature for 24 hours to obtain polycyclohexadiene as a polymer. The yield of the polymer was 94%.

The polymer was a white powder, and insoluble in organic solvents. According to an element analysis, carbon was 90% and hydrogen was 10%, and this was satisfactorily consistent with the calculation values based on the monomers. The temperature at which thermal weight loss started was 330° C.

EXAMPLE 2

The catalyst B (18 mg, 0.1 mmol) previously synthesized was dissolved into 15 ml of toluene at room temperature under an argon atmosphere in a glove box, and then 1.8 ml of a toluene solution (aluminum: 10 atomic %) of methyl aluminoxane which is a co-catalyst to adjust a catalyst solution. Thereafter, the same operation as in Example 1 was conducted to polymerize 1,3-cyclohexadiene. The yield of the resultant 1,3-cyclohexadiene was 75%.

The polymer was a white powder, and insoluble in organic solvents. According to an element analysis, carbon was 90% and hydrogen was 10%. This was satisfactorily consistent with the calculation values based on the monomers. The temperature at which thermal weight loss started was 330° C.

EXAMPLE 3

The catalyst B (0.5 g) previously synthesized was dissolved into 100 ml of toluene at room temperature under an argon atmosphere in a glove box, and then 50 ml of a toluene solution (aluminum: 10 atomic %) of methyl aluminoxane which is a co-catalyst was added thereto so as to adjust a catalyst solution.

50 g of 1,3-cyclohexadiene was dissolved into 200 ml of toluene at room temperature. While this solution was kept to room temperature, the total amount thereof was added to the total amount of the above-mentioned catalyst solution.

At the same time of the addition, a polymerizing reaction advanced at room temperature at a stroke to obtain polycyclohexadiene. The time for the polymerization was 15 seconds. The yield was 82%.

The polymer was a white powder, and insoluble in organic solvents. According to an element analysis, carbon was 90% and hydrogen was 10%. This was satisfactorily consistent with the calculation values based on the monomers. The temperature at which thermal weight loss started was 330° C.

COMPARATIVE EXAMPLE 1

Ethylenebisindenyl zirconium dichloride (a kind of a Kaminsky catalyst) (42 mg, 0.1 mmol) instead of the catalyst A was dissolved into 15 ml of toluene at room temperature under an argon atmosphere in a glove box, and then 1.8 ml of a toluene solution (aluminum: 10 atomic %) of methyl aluminoxane which is a co-catalyst was added thereto to adjust a catalyst solution. Thereafter, the same operation as in Example 1 was performed to attempt polymerization of 1,3-cyclohexadiene. The yield of polycyclohexadiene obtained after stirring at room temperature for 4 days was 5% or less.

EXAMPLE 4

The catalyst C (37 mg, 0.1 mmol) previously synthesized was dissolved into 15 ml of toluene at room temperature under an argon atmosphere in a glove box to adjust a catalyst solution. In the meantime, the monomer (14 g, 0.1 mol) represented by chemical scheme 66 was dissolved into 15 ml of toluene at room temperature under an argon atmosphere in a glove box. While this solution was kept to room temperature and was stirred, the total amount thereof was added to the total amount of the above-mentioned catalyst solution. The polymerizing reaction finished within 3 hours. A slurry containing the produced polymer was taken out from the glove box, and then the polymer was precipitated in a great deal of methanol acidified with hydrochloric acid to isolate the polymer. Methanol was then removed by filtration. The resultant was vacuum-dried at room temperature for 24 hours to obtain a polymer of the monomer represented by the scheme 66. The yield of the polymer was 89%.

EXAMPLE 5

The catalyst D previously synthesized was dissolved into 15 ml of dichloroethane at room temperature under an argon atmosphere in a glove box to adjust a catalyst solution. In the meantime, the monomer (9.4 g, 0.1 mol) represented by the scheme 68 was dissolved into 15 ml of dichloroethane at room temperature under an argon atmosphere in a glove box. While this solution was kept to room temperature and was stirred, the total amount thereof was added to the total amount of the above-mentioned catalyst solution. The polymerizing reaction finished within 1 hour. A slurry containing the produced polymer was taken out from the glove box, and then the polymer was precipitated in a great deal of methanol acidified with hydrochloric acid to isolate the polymer. Methanol was then removed by filtration. The resultant was vacuum-dried at room temperature for 24 hours to obtain a polymer of the monomer represented by the scheme 68. The yield of the polymer was 90%.

EXAMPLE 6

The catalyst E previously synthesized was dissolved into 15 ml of toluene at room temperature under an argon atmosphere in a glove box to adjust a catalyst solution. In the meantime, the monomer (14 g, 0.1 mol) represented by the scheme 62 was dissolved into 15 ml of toluene at room temperature under an argon atmosphere in a glove box. While this solution was kept to room temperature and was stirred, the total amount thereof was added to the total amount of the above-mentioned catalyst solution. The polymerizing reaction finished within 10 hours. A slurry containing the produced polymer was taken out from the glove box, and then the polymer was precipitated in a great deal of methanol acidified with hydrochloric acid to isolate the polymer. Methanol was then removed by filtration. The resultant was vacuum-dried at room temperature for 24 hours to obtain a polymer of the monomer represented by the scheme 62. The yield of the polymer was 93%.

EXAMPLE 7

The catalyst F (71 mg, 0.01 mmol) previously synthesized was dissolved into 15 ml of toluene at room temperature under an argon atmosphere in a glove box, and then 1.8 ml of a toluene solution (aluminum: 10 atomic %) of methyl aluminoxane which is a co-catalyst were added thereto to adjust a catalyst solution. In the meantime, the monomer (16.8 g, 0.1 mol) represented by the scheme 63 was dissolved into 15 ml of toluene at room temperature under an argon atmosphere in a glove box. While this solution was kept to room temperature and was stirred, the total amount thereof was added to the total amount of the above-mentioned catalyst solution. The polymerizing reaction finished within 10 hours. A slurry containing the produced polymer was taken out from the glove box, and then the polymer was precipitated in a great deal of methanol acidified with hydrochloric acid to isolate the polymer. Methanol was then removed by filtration. The resultant was vacuum-dried at room temperature for 24 hours to obtain a polymer of the monomer represented by the scheme 63. The yield of the polymer was 88%.

EXAMPLE 8

The catalyst G (41 mg, 0.1 mmol) previously synthesized was dissolved into 15 ml of ethyl acetate at room temperature under an argon atmosphere in a glove box to adjust a catalyst solution. In the meantime, the monomer (11.2 g, 0.1 mol) represented by the scheme 56 was dissolved into 15 ml of ethyl acetate at room temperature under an argon atmosphere in a glove box. While this solution was kept to room temperature and was stirred, the total amount thereof was added to the total amount of the above-mentioned catalyst solution. The polymerizing reaction finished within 24 hours. A slurry containing the produced polymer was taken out from the glove box, and then the polymer was precipitated in a great deal of n-hexane acidified with hydrochloric acid to isolate the polymer. N-Hexane was then removed by filtration. The resultant was vacuum-dried at room temperature for 24 hours to obtain a polymer of the monomer represented by the scheme 56. The yield of the polymer was 84%.

EXAMPLE 9

The catalyst H (46 mg, 0.1 mmol) previously synthesized was dissolved into 15 ml of THF at room temperature under an argon atmosphere in a glove box to adjust a catalyst solution. In the meantime, the monomer (26.8 g, 0.1 mol) represented by the scheme 57 was dissolved into 15 ml of THF at room temperature under an argon atmosphere in a glove box. While this solution was kept to room temperature and was stirred, the total amount thereof was added to the total amount of the above-mentioned catalyst solution. The polymerizing reaction finished within 24 hours. A slurry containing the produced polymer was taken out from the glove box, and then the polymer was precipitated in a great deal of methanol acidified with hydrochloric acid to isolate the polymer. Methanol was then removed by filtration. The resultant was vacuum-dried at room temperature for 24 hours to obtain a polymer of the monomer represented by the scheme 57. The yield of the polymer was 96%.

EXAMPLE 10

The catalyst I previously synthesized was dissolved into 15 ml of dichloroethane at room temperature under an argon atmosphere in a glove box to adjust a catalyst solution. In the meantime, the monomer (15 g, 0.1 mol) represented by the scheme 61 (wherein R was a methyl group) was dissolved into 15 ml of dichloroethane at room temperature under an argon atmosphere in a glove box. While this solution was kept to room temperature and was stirred, the total amount thereof was added to the total amount of the above-mentioned catalyst solution. The polymerizing reaction finished within 24 hours. A slurry containing the produced polymer was taken out from the glove box, and then the polymer was precipitated in a great deal of methanol acidified with hydrochloric acid to isolate the polymer. Methanol was then removed by filtration. The resultant was vacuum-dried at room temperature for 24 hours to obtain a polymer of the monomer represented by the scheme 61. The yield of the polymer was 91%.

EXAMPLE 11

The catalyst B (18 mg, 0.1 mmol) previously synthesized was dissolved into 15 ml of toluene at room temperature under an argon atmosphere in a Schlenck tube, and then 1.8 ml of a toluene solution (aluminum: 10 atomic %) of methyl aluminoxane which is a co-catalyst was added thereto so as to adjust a catalyst solution. In the meantime, 1,3-cyclohexadiene (8 g, 0.1 mol) and butadiene (10.8 g, 0.2 mol) as monomers were dissolved into 15 ml of toluene at room temperature under an argon atmosphere. While this solution was kept to room temperature and was stirred, the total amount thereof was added to the total amount of the above-mentioned catalyst solution. Polymerization advanced promptly and the reaction finished within 30 minutes. A slurry containing the produced polymer was added to a great deal of methanol acidified with hydrochloric acid to precipitate and isolate the polymer. Methanol was then removed by filtration. The resultant was vacuum-dried at room temperature for 24 hours to obtain a cyclohexadiene-butadiene copolymer. The yield of the polymer was 88%.

EXAMPLE 12

The catalyst F (71 mg, 0.1 mmol) previously synthesized was dissolved into 15 ml of toluene at room temperature under an argon atmosphere in a Schlenck tube, and then 1.8 ml of a toluene solution (aluminum: 10 atomic %) of methyl aluminoxane which is a co-catalyst was added thereto so as to adjust a catalyst solution. In the meantime, 1,3-cyclohexadiene (8 g, 0.1 mol) and propylene (12.6 g, 0.3 mol) as monomers were dissolved into 15 ml of toluene at room temperature under an argon atmosphere. While this solution was kept to room temperature and was stirred, the total amount thereof was added to the total amount of the above-mentioned catalyst solution. Polymerization advanced promptly and the reaction finished within 1 hour. A slurry containing the produced polymer was precipitated in a great deal of methanol acidified with hydrochloric acid to isolate the polymer. Methanol was then removed by filtration. The resultant was vacuum-dried at room temperature for 24 hours to obtain a cyclohexadiene-propylene copolymer. The yield of the polymer was 91%.

EXAMPLE 13

The catalyst A (109 mg, 0.1 mmol) previously synthesized was dissolved into 15 ml of toluene at room temperature under an argon atmosphere in a glove box to adjust a catalyst solution. In the meantime, the monomer (14 g, 0.1 mol) represented by the scheme 62 and isobutyl vinyl ether (10 g, 0.1 mol) were dissolved into 15 ml of toluene at room temperature under an argon atmosphere. While this solution was kept to room temperature and was stirred, the total amount thereof was added to the total amount of the above-mentioned catalyst solution. Polymerization advanced promptly and the reaction finished within 3 hours.

A slurry of the produced polymer was added to a great deal of methanol acidified with hydrochloric acid to precipitate and isolate the polymer. Methanol was then removed by filtration. The resultant was vacuum-dried at room temperature for 24 hours to obtain a copolymer of the monomer represented by the scheme 62 and isobutyl vinyl ether. The yield of the polymer was 90%.

EXAMPLE 14

The catalyst A (109 mg, 0.1 mmol) previously synthesized was dissolved into 15 ml of toluene at room temperature under an argon atmosphere in a glove box to adjust a catalyst solution. In the meantime, the norbornene (4.7 g, 0.05 mol) was dissolved into 15 ml of toluene at room temperature under an argon atmosphere. While this solution was kept to room temperature and was stirred, the total amount thereof was added to the total amount of the above-mentioned catalyst solution. The solution was stirred at room temperature for 1 hour and then the monomer (10.8 g, 0.1 mol) represented by the scheme 69 was added thereto. Polymerization advanced promptly and the reaction finished within 3 hours. A slurry of the produced polymer was added to a great deal of methanol acidified with hydrochloric acid to precipitate and isolate the polymer. Methanol was then removed by filtration. The resultant was vacuum-dried at room temperature for 24 hours to obtain a desired block copolymer of norbornene-the monomer represented by the scheme 69. The yield of the polymer was 87%.

EXAMPLE 15

The catalyst H (48 mg, 0.1 mmol) previously synthesized was dissolved into 15 ml of toluene at room temperature under an argon atmosphere in a glove box to adjust a catalyst solution. In the meantime, 1,3-cyclohexadiene(8 g, 0.1 mol) and the monomer (26.8 g, 0.1 mol) represented by the scheme 57 were dissolved into 15 ml of THF at room temperature under an argon atmosphere. While this solution was kept to room temperature and was stirred, the total amount thereof was added to the total amount of the above-mentioned catalyst solution. Polymerization advanced promptly and the reaction finished within 24 hours. A slurry of the produced polymer was added to a great deal of methanol acidified with hydrochloric acid to precipitate and isolate the polymer. Methanol was then removed by filtration. The resultant was vacuum-dried at room temperature for 24 hours to obtain a copolymer of cyclohexadiene-the monomer represented by the scheme 57. The yield of the polymer was 90%.

EXAMPLE 16

The catalyst F (71 mg, 0.1 mmol) previously synthesized was dissolved into 200 ml of toluene at room temperature under an argon atmosphere in a glove box, and then 1.8 ml of a toluene solution (aluminum: 10 atomic %) of MMAO (Modified Methylaluminoxane; a mixture of about 75% methylaluminoxane and about 25% isobutylaluminoxane) which is a co-catalyst was added thereto so as to adjust a catalyst solution. In the meantime, propylene (4.2 g, 0.1 mol) was dissolved into 15 ml of toluene at room temperature under an argon atmosphere. While this solution was kept to room temperature and was stirred, the total amount thereof was added to the total amount of the above-mentioned catalyst solution. The solution was stirred at room temperature for 1 hour, and then 1,3-cyclohexadiene(8 g, 0.1 mol) was added thereto. Polymerization advanced promptly and the polymerizing reaction finished within 3 hours. A slurry containing the produced polymer was added to a great deal of methanol acidified with hydrochloric acid to precipitate and isolate the polymer. Methanol was then removed by filtration. The resultant was vacuum-dried at room temperature for 24 hours to obtain a desired propylene-cyclohexadiene block copolymer. The yield of the polymer was 93%.

EXAMPLE 17

The catalyst J (147 g, 0.1 mol) previously synthesized was dissolved into 15 ml of toluene at room temperature under an argon atmosphere in a Schlenck tube to adjust a catalyst solution. In the meantime, 1,3-cyclohexadiene(8 g, 0.1 mol), propylene (4.2 g, 0.1 mol) and methylmethacrylate (1 g, 0.01 mmol) were dissolved into 15 ml of toluene at room temperature under an argon atmosphere. While this solution was kept to room temperature and was stirred, the total amount thereof was added to the total amount of the above-mentioned catalyst solution. Polymerization advanced promptly and the reaction finished within 24 hours. A slurry of the produced polymer was added to a great deal of methanol acidified with hydrochloric acid to precipitate and isolate the polymer. Methanol was then removed by filtration. The resultant was vacuum-dried at room temperature for 24 hours to obtain a desired cyclohexadiene-propylene-methylmethacrylate terpolymer. The yield of the polymer was 85%.

(2) Hydrogenation of Poly(Cyclic Conjugated Diene)

[Preparation Example a of a Poly(Cyclic Conjugated Diene) as a Precursor]

In a glove box, 18 mg of bisallyl nickel bromide (the catalyst B), 0.58 g of methylaluminoxane, and 15 g of o-dichlorobenzene were mixed at room temperature under an argon atmosphere to adjust a catalyst solution. In the meantime, 8 g of 1,3-cyclohexadiene as a cyclic conjugated diene monomer, was dissolved into 15 g of o-dichlorobenzene at room temperature under an argon atmosphere in a glove box. While this solution was kept to room temperature and was stirred, the total amount thereof was added to the total amount of the above-mentioned catalyst solution. Polymerization advanced promptly to precipitate a powdery polymer from the toluene solution (the polymerizing reaction finished within 30 minutes). A slurry of the produced polymer was taken out from the glove box and added to a great deal of methanol acidified with hydrochloric acid to precipitate and isolate the polymer. Methanol was then removed by filtration. The resultant was vacuum-dried at room temperature for 24 hours to obtain 7.6 g of polycyclohexadiene.

[Preparation Example b of a Poly(Cyclic Conjugated Diene) as a Precursor]

In a glove box, 18 mg of bisallyl nickel bromide (the catalyst B), 0.58 g of methylaluminoxane, and 15 g of toluene were mixed at room temperature under an argon atmosphere to adjust a catalyst solution. In the meantime, 8 g of 1,3-cyclohexadiene and 10 g of butadiene, as monomers, were dissolved into 15 g of toluene at room temperature under an argon atmosphere in a glove box. While this solution was kept to room temperature and was stirred, the total amount thereof was added to the total amount of the above-mentioned catalyst solution. Polymerization advanced promptly, and the reaction finished within 30 minutes. A slurry of the produced polymer was taken out from the glove box and added to a great deal of methanol acidified with hydrochloric acid to precipitate and isolate the polymer. Methanol was then removed by filtration. The resultant was vacuum-dried at room temperature for 24 hours to obtain 16 g of a cyclohexadiene-butadiene copolymer.

[Preparation example c of a poly(cyclic conjugated diene) as a precursor]

The same operation as in Preparation example b was conducted except that 3 g of 1,3-cyclohexadiene and 10 g of butadiene were added, so as to obtain 11 g of a cyclohexadiene-butadiene copolymer.

[Preparation Example d of a Poly(Cyclic Conjugated Diene) as a Precursor]

In a glove box, 18 mg of bisallyl nickel bromide (the catalyst B), 0.58 g of methylaluminoxane, and 15 g of o-dichlorobenzene were mixed at room temperature under an argon atmosphere to adjust a catalyst solution. In the meantime, 8 g of norbornene, as a monomer, were dissolved into 15 g of o-dichlorobenzene at room temperature under an argon atmosphere in a glove box. While this solution was kept to room temperature and was stirred, the total amount thereof was added to the total amount of the above-mentioned catalyst solution. The reacting solution was stirred at room temperature for 10 hours, and then 2 g of 1,3-cyclohexadiene were added thereto, so as to obtain a reacting solution of a polymer. A slurry containing the produced polymer was taken out from the glove box and added to a great deal of methanol acidified with hydrochloric acid to precipitate and isolate the polymer. Methanol was then removed by filtration. The resultant was vacuum-dried at room temperature for 24 hours to obtain 9.6 g of a block copolymer of norbornene-cyclohexadiene.

[Preparation Example e of a Poly(Cyclic Conjugated Diene) as a Precursor]

The same operation as in Adjustment example a was conducted except that 5,6-bis(trimethylsiloxy)-1,3-cyclohexadiene was used instead of 1,3-cyclohexadiene, so as to obtain 7.4 g of a polymer.

[Preparation Example f of a Poly(Cyclic Conjugated Diene) as a Precursor]

The same operation as in Adjustment example a was conducted except that a mixture of 4 g of 1,3-cyclohexadiene and 4 g of 5,6-bis(trimethylsiloxy)-1,3-cyclohexadiene was used instead of 8 g of 1,3-cyclohexadiene, so as to obtain 7.7 g of a copolymer of 1,3-cyclohexadiene-5,6-bis(trimethylsiloxy)-1,3-cyclohexadiene.

EXAMPLE 18

Under a nitrogen atmosphere, 1 g of the polymer obtained in Preparation example a and 100 ml of cyclohexane were introduced into an autoclave, and to the solution was added a catalyst solution prepared from 0.3 mmol of dicyclopentadienyltitanium dichloride ($Cp_2TiCl_2$) and 1.8 mmol of triisobutylaluminum as a hydrogenating catalyst. Subsequently, the atmosphere in the autoclave was replaced with hydrogen gas, and the temperature was raised to 180° C. Thereafter, hydrogenation reaction was conducted for 4 hours at a hydrogen pressure of 85 kg/cm$^2$G. The produced polymer was taken out from the autoclave and added to a great deal of methanol acidified with hydrochloric acid to precipitate and isolate the polymer. Methanol was then removed by filtration. The resultant was vacuum-dried at room temperature for 24 hours to obtain a hydrogenated polymer. The hydrogenation ratio based on 1H NMR was 100%.

EXAMPLE 19

The same operation as in Example 18 was conducted except that the cyclohexadiene-butadiene copolymer obtained in Adjustment example b was used. The hydrogenation ratio was 100%.

EXAMPLE 20

The same operation as in Example 19 was conducted except that RuHCl(CO) [P($C_6H_5$)] was used as the hydrogenating catalyst. The hydrogenation ratio was 93%.

EXAMPLE 21

The same operation as in Example 19 was conducted except that 0.3 mmol of Co(acac)$_3$ and 1.8 mmol of triisobutylaluminum were used as the hydrogenating catalyst. The hydrogenation ratio was 100%.

EXAMPLE 22

The same operation as in Example 19 was conducted except that RuHCl(CO)[P($C_6H_5$)] was used as the hydrogenating catalyst. The hydrogenation ratio was 93%.

EXAMPLE 23

The same operation as in Example 18 was conducted except that the polymer synthesized in Preparation example c was used. The hydrogenation ratio was 100%.

EXAMPLE 24

The same operation as in Example 21 was conducted except that the polymer synthesized in Preparation example c was used. The hydrogenation ratio was 100%.

EXAMPLE 25

The same operation as in Example 18 was conducted except that the polymer synthesized in Preparation example d was used. The hydrogenation ratio was 100%.

EXAMPLE 26

The same operation as in Example 18 was conducted except that the polymer synthesized in Preparation example e was used. The hydrogenation ratio was 100%.

EXAMPLE 27

The same operation as in Example 21 was conducted except that the polymer synthesized in Preparation example f was used. The hydrogenation ratio was 100%.

(3) Processes for Polymerizing Cyclic Conjugated Diene Monomers in the Presence of Basic Compounds

EXAMPLE 28

In a glove box, 18 mg of bisallyl nickel bromide (the catalyst B), 0.58 g of methylaluminoxane, 15 g of toluene and 100 mg of THF were mixed at room temperature under an argon atmosphere to adjust a catalyst solution. In the meantime, 8 g of 1,3-cyclohexadiene as a cyclic conjugated diene monomer was dissolved into 15 g of toluene at room temperature under an argon atmosphere in a glove box. While this solution was kept to room temperature and was stirred, the total amount thereof was added to the total amount of the above-mentioned catalyst solution. Polymerization advanced promptly to precipitate a powdery polymer from the toluene solution (the polymerizing reaction finished within 1 minute). A slurry containing the produced polymer was taken out from the glove box and added to a great deal of methanol acidified with hydrochloric acid to precipitate and isolate the polymer. Methanol was then removed by filtration. The resultant was vacuum-dried at room temperature for 24 hours to obtain 7.9 g of polycyclohexadiene (yield: 99%).

EXAMPLE 29

The same operation as in Example 28 was conducted except that the amount of THF was set to 200 mg, to polymerize 1,3-cyclohexadiene. Polymerization advanced promptly to obtain 7.7 g of polycyclohexadiene (yield: 96%.

EXAMPLE 30

The same operation as in Example 28 was conducted except that the amount of THF was set to 65 mg, to polymerize 1,3-cyclohexadiene. Polymerization advanced promptly to obtain 7.7 g of polycyclohexadiene (yield: 96%).

EXAMPLE 31

The same operation as in Example 28 was conducted except that 100 mg of THF was replaced with 200 mg of diethyl ether, to polymerize 1,3-cyclohexadiene. Polymerization advanced promptly to obtain 7.6 g of polycyclohexadiene (yield: 95%).

EXAMPLE 32

The same operation as in Example 28 was conducted except that 100 mg of THF was replaced with 100 mg of dioxane, to polymerize 1,3-cyclohexadiene. Polymerization advanced promptly to obtain 7.7 g of polycyclohexadiene (yield: 96%).

COMPARATIVE EXAMPLE 2

The same operation as in Example 28 was conducted except that any THF was not added, to polymerize 1,3-cyclohexadiene. Polymerization advanced promptly to obtain polycyclohexadiene. The produced amount thereof was however 6.0 g (yield: 75%). This produced amount did not change even when the time for the polymerization was extended to at most 24 hours.

COMPARATIVE EXAMPLE 3

The same operation as in Example 28 was conducted except that 30 g of THF was added instead of 30 g (15 g +15 g) of toluene, to polymerize 1,3-cyclohexadiene. Polymerization hardly advanced. Even after the reaction for 24 hours, only a trace amount of polycyclohexadiene was obtained (yield <1%).

COMPARATIVE EXAMPLE 4

The same operation as in Example 28 was conducted except that 600 g of THF was added, to polymerize 1,3-cyclohexadiene. Polymerization hardly advanced. Even after the reaction for 24 hours, only a trace amount of polycyclohexadiene was obtained (yield <1%).

(4) Processes for Polymerizing of Poly(Cyclic Conjugated Diene) in Aromatic Halide Solvent

EXAMPLE 33

In a glove box, 72 mg of the catalyst F, 0.58 g of methylaluminoxane and 15 g of o-dichlorobenzene were mixed at room temperature under an argon atmosphere to adjust a catalyst solution. In the meantime, 8 g of 1,3-cyclohexadiene as a cyclic conjugated diene monomer was dissolved into 15 g of o-dichlorobenzene at room temperature under an argon atmosphere in a glove box. While this solution was kept to room temperature and was stirred, the total amount thereof was added to the total amount of the above-mentioned catalyst solution. Polymerization advanced uniformly and promptly. The polymerizing reaction finished within 24 hours. An o-dichlorobenzene solution containing the produced polymer was taken out from the glove box and added to a great deal of methanol acidified with hydrochloric acid to precipitate and isolate the polymer. Methanol was then removed by filtration. The resultant was vacuum-dried at room temperature for 24 hours to obtain 7.9 g of polycyclohexadiene (yield: 99%).

EXAMPLE 34

The same operation as in Example 33 was conducted except that o-dichlorobenzene was replaced with chlorobenzene, to polymerize 1,3-cyclohexadiene. Polymerization advanced promptly to obtain 7.3 g of polycyclohexadiene (yield: 91%).

EXAMPLE 35

The same operation as in Example 33 was conducted except that o-dichlorobenzene was replaced with 1,2,4-trichlorobenzene, to polymerize 1,3-cyclohexadiene. Polymerization advanced promptly to obtain 7.9 g of polycyclohexadiene (yield: 99%).

EXAMPLE 36

The same operation as in Example 33 was conducted except that the catalyst F was replaced with the catalyst K, to polymerize 1,3-cyclohexadiene. Polymerization advanced promptly to obtain 7.7 g of polycyclohexadiene (yield: 96%).

[Scheme 95]

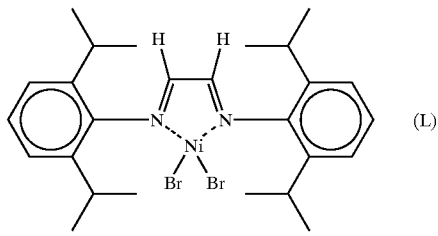

(L)

EXAMPLE 37

The same operation as in Example 33 was conducted except that the catalyst F was replaced with the catalyst L, to polymerize 1,3-cyclohexadiene. Polymerization advanced promptly to obtain 7.7 g of polycyclohexadiene (yield: 96%).

[Scheme 96]

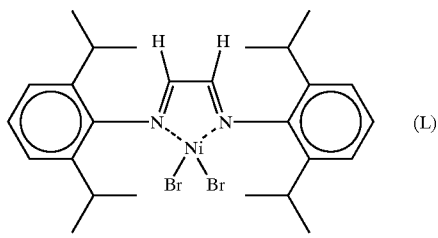

(L)

EXAMPLE 38

The same operation as in Example 33 was conducted except that the catalyst F was replaced with the catalyst M, to polymerize 1,3-cyclohexadiene. Polymerization advanced promptly to obtain 7.6 g of polycyclohexadiene (yield: 95%).

[Scheme 97]

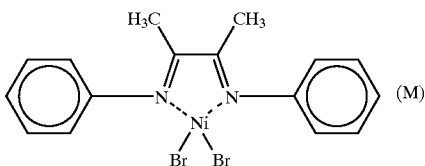

(M)

EXAMPLE 39

The same operation as in Example 33 was conducted except that the catalyst F was replaced with the catalyst N, to polymerize 1,3-cyclohexadiene. Polymerization advanced promptly to obtain 7.6 g of polycyclohexadiene (yield: 95%).

[Scheme 98]

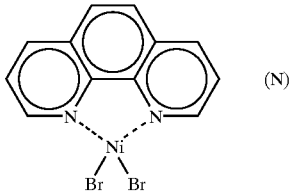

(N)

EXAMPLE 40

The same operation as in Example 33 was conducted except that 8 g of 1,3-cyclohexadiene was replaced with a mixture of 5 g of 1,3-cyclohexadiene and 3 g of butadiene, to polymerize the monomers. Polymerization advanced promptly to obtain 7.9 g of a cyclohexadiene-butadiene copolymer (yield: 99%).

COMPARATIVE EXAMPLE 5

The same operation as in Example 33 was conducted except that o-dichlorobenzene was replaced with toluene, to polymerize 1,3-cyclohexadiene. After 24 hours, the produced amount of polycyclohexadiene was 0.7 g (yield: 9%).

COMPARATIVE EXAMPLE 6

The same operation as in Example 33 was conducted except that o-dichlorobenzene was replaced with benzene, to polymerize 1,3-cyclohexadiene. After 24 hours, the produced amount of polycyclohexadiene was 0.9 g (yield: 11%).

(5) Processes for Producing Poly(Cyclic Conjugated Diene) Having High Crystallizability

EXAMPLE 41

In a glove box, 18 mg of bisallyl nickel bromide (the catalyst B), 0.58 g of methylaluminoxane, and 15 g of toluene were mixed at room temperature under an argon atmosphere to adjust a catalyst solution. In the meantime, 8 g of 1,3-cyclohexadiene, as a cyclic conjugated diene monomer, were dissolved into 15 g of toluene at room temperature under an argon atmosphere in a glove box. While this solution was kept to room temperature and was stirred, the total amount thereof was added to the total amount of the above-mentioned catalyst solution. Polymerization advanced promptly to precipitate a powdery polymer from the toluene solution (the polymerizing reaction finished within 30 minutes). A slurry containing the produced polymer was taken out from the glove box and added to a great deal of methanol acidified with hydrochloric acid to precipitate and isolate the polymer. Methanol was then removed by filtration. The resultant was vacuum-dried at room temperature for 24 hours to obtain 6.0 g of polycyclohexadiene (yield: 75%). Powder X-ray diffraction analysis of the produced polymer demonstrated strong diffraction peaks at 2θ=16.7, 19.5 and 22.5 (degrees), to confirm that the polymer had crystallizability.

EXAMPLE 42

The same operation as in Example 41 was conducted except that toluene was replaced with o-dichlorobenzene, to polymerize 1,3-cyclohexadiene. Polymerization advanced promptly to obtain 7.6 g of polycyclohexadiene (yield: 99%). Powder X-ray diffraction analysis of the produced polymer demonstrated strong diffraction peaks at 2θ=16.7, 19.5 and 22.5 (degrees), to confirm that the polymer had crystallizability.

EXAMPLE 43

The same operation as in Example 41 was conducted except that bisallyl nickel bromide was replaced with bisallyl nickel chloride, to polymerize 1,3-cyclohexadiene. Polymerization advanced promptly to obtain 6.0 g of polycyclohexadiene (yield: 75%). Powder X-ray diffraction analysis of the produced polymer demonstrated strong diffraction peaks at 2θ=16.7, 19.5 and 22.5 (degrees), to confirm that the polymer had crystallizability.

EXAMPLE 44

The same operation as in Example 42 was conducted except that bisallyl nickel bromide was replaced with the catalyst F, to polymerize 1,3-cyclohexadiene. Polymerization advanced promptly to obtain 7.6 g of polycyclohexadiene (yield: 99%). Powder X-ray diffraction analysis of the produced polymer demonstrated strong diffraction peaks at 2θ=16.7, 19.5 and 22.5 (degrees), to confirm that the polymer had crystallizability.

EXAMPLE 45

The same operation as in Example 42 was conducted except that bisallyl nickel bromide was replaced with the catalyst L, to polymerize 1,3-cyclohexadiene. Polymerization advanced promptly to obtain 7.6 g of polycyclohexadiene (yield: 99%). Powder X-ray diffraction analysis of the produced polymer demonstrated strong diffraction peaks at 2θ=16.7, 19.5 and 22.5 (degrees), to confirm that the polymer had crystallizability.

EXAMPLE 46

The same operation as in Example 41 was conducted except that bisallyl nickel bromide was replaced with the catalyst represented by the scheme 81, to polymerize 1,3-cyclohexadiene. Polymerization advanced promptly to obtain 7.0 g of polycyclohexadiene (yield: 88%). Powder X-ray diffraction analysis of the produced polymer demonstrated strong diffraction peaks at 2θ=16.7, 19.5 and 22.5 (degrees), to confirm that the polymer had crystallizability.

EXAMPLE 47

The same operation as in Example 42 was conducted except that bisallyl nickel bromide was replaced with the catalyst represented by the scheme 81, to polymerize 1,3-cyclohexadiene. Polymerization advanced promptly to obtain 7.9 g of polycyclohexadiene (yield: 99%). Powder X-ray diffraction analysis of the produced polymer demonstrated strong diffraction peaks at 2θ=16.7, 19.5 and 22.5 (degrees), to confirm that the polymer had crystallizability.

EXAMPLE 48

The same operation as in Example 41 was conducted except that methyl aluminoxane was replaced with MMAO (Modified Methyl Aluminoxane; a cooligomer of methyl aluminoxane and isobutyl aluminoxane), to polymerize 1,3-cyclohexadiene. Polymerization advanced promptly to obtain 6.0 g of polycyclohexadiene (yield: 75%). Powder X-ray diffraction analysis of the produced polymer demonstrated strong diffraction peaks at 2θ=16.7, 19.5 and 22.5 (degrees), to confirm that the polymer had crystallizability.

EXAMPLE 49

The same operation as in Example 41 was conducted except that toluene was replaced with cyclohexane, to polymerize 1,3-cyclohexadiene. Polymerization advanced promptly to obtain 7.3 g of polycyclohexadiene (yield: 91%). Powder X-ray diffraction analysis of the produced polymer demonstrated strong diffraction peaks at 2θ=16.7, 19.5 and 22.5 (degrees), to confirm that the polymer had crystallizability.

EXAMPLE 50

The same operation as in Example 41 was conducted except that bisallyl nickel bromide was replaced with the catalyst N, to polymerize 1,3-cyclohexadiene. Polymerization advanced promptly to obtain 7.0 g of polycyclohexadiene (yield: 88%). Powder X-ray diffraction analysis of the produced polymer demonstrated strong diffraction peaks at 2θ=16.7, 19.5 and 22.5 (degrees), to confirm that the polymer had crystallizability.

EXAMPLE 51

The same operation as in Example 42 was conducted except that bisallyl nickel bromide was replaced with the catalyst O, to polymerize 1,3-cyclohexadiene. Polymerization advanced promptly to obtain 7.9 g of polycyclohexadiene (yield: 99%). Powder X-ray diffraction analysis of the produced polymer demonstrated strong diffraction peaks at 2θ=16.7, 19.5 and 22.5 (degrees), to confirm that the polymer had crystallizability.

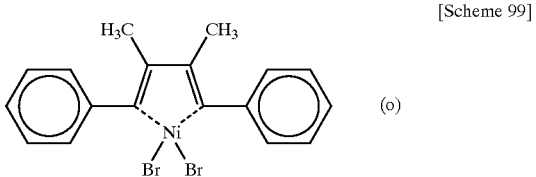

[Scheme 99]

(o)

COMPARATIVE EXAMPLE 7

In a glove box, 0.5 g of n-hexane solution of n-BuLi, 0.32 g of tetramethylethylenediamine, and 15 g of cyclohexane were mixed at room temperature under an argon atmosphere to adjust a catalyst solution. In the meantime, 8 g of 1,3-cyclohexadiene, as a cyclic conjugated diene monomer, were dissolved into 15 g of cyclohexane at room temperature under an argon atmosphere in a glove box. While this solution was kept to room temperature and was stirred, the total amount thereof was added to the total amount of the above-mentioned catalyst solution. After the reacting solution was allowed to stand at 40° C. for 10 hours, the solution was taken out from the glove box, and added to a great deal of methanol acidified with hydrochloric acid to precipitate and isolate the polymer. Methanol was then removed by filtration. The resultant was vacuum-dried at room temperature for 24 hours to obtain 6.9 g of polycyclohexadiene (yield: 86%). Powder X-ray diffraction analysis of the produced polymer demonstrated only a halo, indicating that the polymer was in an amorphous form.

COMPARATIVE EXAMPLE 8

The same operation as in Comparative Example 7 was conducted except that n-BuLi was replaced with sec-BuLi, to polymerize 1,3-cyclohexadiene. Powder X-ray diffraction analysis of the produced polymer demonstrated only a halo, indicating that the polymer was in an amorphous form.

COMPARATIVE EXAMPLE 9

The same operation as in Comparative Example 7 was conducted except that tetramethylethylenediamine was replaced with tetramethyl-1,6-hexanediamine, to polymerize 1,3-cyclohexadiene. Powder X-ray diffraction analysis of the produced polymer demonstrated only a halo, indicating that the polymer was in an amorphous form.

(6) Processes for Producing a Poly(Cyclic Conjugated Diene) Comprising Phenylene

EXAMPLE 52

In a glove box, 18 mg of bisallyl nickel bromide (the catalyst B), 0.58 g of methylaluminoxane, and 15 g of o-dichlorobenzene were mixed at room temperature under an argon atmosphere to adjust a catalyst solution. In the meantime, 5 g of norbornene as a monomer was dissolved into 15 g of o-dichlorobenzene at room temperature under an argon atmosphere in a glove box. While this solution was kept to room temperature and was stirred, the total amount thereof was added to the total amount of the above-mentioned catalyst solution. The reacting solution was stirred at room temperature for 10 hours, and then 5 g of 5,6-bis(trimethylsiloxy)-1,3-cyclohexadiene was added thereto so as to obtain a reacting solution of a polymer. A slurry containing the produced polymer was taken out from the glove box and added to a great deal of methanol acidified with hydrochloric acid to precipitate and isolate the polymer.

Subsequently, methanol was removed by filtration. The resultant was vacuum-dried at room temperature for 24 hours to obtain 9.6 g of a block copolymer of norbornene-5,6-bis(trimethylsiloxy)-1,3-cyclohexadiene-1,3-cyclohexadiene. Under an argon atmosphere, 2.5 g of anhydrous $ZnCl_2$ and 250 ml of diethyl ether were added to 4.5 of the above-mentioned block copolymer and then the resultant solution was vigorously stirred (for 1 hour). When $ZnCl_2$ was dissolved, 5.6ml of acetyl chloride was added thereto. The solution was stirred at room temperature for 18 hours. A slurry containing the produced polymer was then taken out from the glove box, and added to a great deal of methanol acidified with hydrochloric acid to precipitate and isolate the polymer. Subsequently, methanol was removed by filtration. The resultant was vacuum-dried at room temperature for 24 hours to obtain 9.4 g of a block copolymer of norbornene-5,6-bis(acetoxy)-1,3-cyclohexadiene. This polymer was treated at 300° C. under a nitrogen atmosphere for 2 hours to obtain 9.1 g of a block copolymer of norbornene-paraphenylene.

EXAMPLE 53

The same operation as in Example 52 was conducted except that norbornene was replaced with dicyclopentadiene, to produce 9.0 g of a block copolymer of dicyclopentadiene-paraphenylene.

EXAMPLE 54

The same operation as in Example 52 was conducted except that norbornene was replaced with ethylidenenorbornene, to produce 9.0 g of a block copolymer of ethylidenenorbornene-paraphenylene.

EXAMPLE 55

The same operation as in Example 52 was conducted except that norbornene was replaced with tetracyclododecene, to produce 9.2 g of a block copolymer of tetracyclododecene-paraphenylene.

EXAMPLE 56

The same operation as in Example 52 was conducted except that the catalyst B was replaced with the catalyst F and norbornene was replaced with propylene, to produce 8.5 g of a block copolymer of propylene-paraphenylene.

EXAMPLE 57

The same operation as in Example 56 was conducted except that propylene was replaced with cyclopentene, to produce 8.9 of a block copolymer of cyclopentene-paraphenylene.

What is claimed is:

1. A process for producing a poly(cyclic conjugated diene) comprising the step of polymerizing a cyclic conjugated diene monomer or a cyclic conjugated diene monomer and a double bond-containing monomer in the presence of a catalyst of formula (IV):

$$[L_n MX_m]^{a+}[A]^{a-} \tag{IV}$$

wherein M represents a transition metal element of the eighth, ninth or tenth group in the periodic table; L represents a ligand having 1–3π bonds; X represents a ligand having at least one σ bond and 0–37π bonds; n is 0,1 or 2; m is 0 or 1; both of n and m are not 0 at the same time; when m is 0, a is 2; when m is 1, a is 1; and A represents a counter anion of $[L_n MX_m]^{a+}$, or a multi-component catalyst containing:
 (a) a transition metal compound of a transition metal element of the eighth, ninth or tenth group in the periodic table, and
 (b) an organic aluminum compound, and/or
 (c) an electron donating component.

2. A process for producing a poly(cyclic conjugated diene) according to claim 1, wherein the polymerizing reaction is conducted in a non-polar solvent containing a basic compound.

3. A process for producing a poly(cyclic conjugated diene) according to claim 2, wherein the weight ratio of the basic compound to the non-polar solvent is from 1/500 to 1/100.

4. A process for producing a poly(cyclic conjugated diene) according to claim 2 or claim 3, wherein the basic compound is tetrahydrofuran.

5. A process for producing a poly(cyclic conjugated diene) according to claim 1, wherein the polymerizing reaction is conducted in an aromatic halide.

6. A process for producing a poly(cyclic conjugated diene) according to claim 5, wherein the aromatic halide is chlorobenzene or o-dichlorobenzene.

7. The process of claim 1, wherein the conjugated dience monomer is a substituted cyclohexadiene.

8. The process of claim 1, wherein the conjugated diene monomer is a 5–8-membered ring having at least one silicon or germanium atom in the ring.

9. The process of claim 1, wherein the double-bond containing monomer is at least one monomer selected from the group consisting of an olefin, an isoolefin, a branched α-olefin, a conjugated olefin, a cyclic olefin, a vinyl olefin, cyclic ether, and a lactone monomer.

10. The process of claim 1, wherein the poly(cyclic conjugated diene) is a copolymer selected from the group consisting of random copolymers, alternate copolymers, and block copolymers.

11. The process of claim 1, wherein the catalyst or multi-component catalyst is present in an amount of from $1 \times 10^{-6}$ to $1 \times 10^{-1}$ moles of the metal element of the catalyst per mole of conjugated diedne monomer and double-bond containing monomer.

12. A process for producing a poly(cyclic conjugated diene) comprising the steps of:

preparing a polymer by polymerizing a cyclohexadiene derivative whose molecular structure is represented by the formula (V),

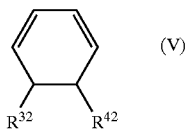
(V)

wherein substituents $R^{32}$ and $R^{42}$ are each individually selected from a hydroxyl group, —O(CO)—R wherein R represents an alkyl group, or trialkylsiloxy group wherein three alkyl groups are the same or different kinds, or the cyclohexadiene derivative and a double bond-containing monomer;

under the catalytic activity of a compound represented by the formula (IV):

$[L_nMX_m]^{a+}[A]^{a-}$ (IV)

wherein M represents a transition metal element of the eighth, ninth or tenth group in the periodic table; L represents a ligand having 1–3π bonds; X represents a ligand having at least one σ bond and 0–3π bonds; n is 0,1 or 2; m is 0 or 1; both of n and m are not 0 at the same time; when m is 0, a is 2; when m is 1, a is 1; and A represents a counter anion of $[L_nMX_m]^{a+}$, or a multi-component catalyst containing:
(a) a transition metal compound of a transition metal element of the eighth, ninth or tenth group in the periodic table, and
(b) an organic aluminum compound, and/or
(c) an electron donating component: and
converting the cyclohexadiene derivative of the polymer into paraphenylene by removing the substituents from the cyclohexadiene derivative of the polymer.

13. A process for producing a poly(cyclic conjugated diene) comprising polymerizing a cyclic conjugated monomer of a cyclic conjugated diene monomer and a double-bond containing monomer in the presence of a catalyst of formula (IVA):

$[L_nNiX_m]^{a+}[A]^{a-}$ (IVA)

wherein L represents a ligand having 1–3 π bonds; X represents a ligan having at least one σ bond and 0–3 bonds; n is 0, 1 or 2; m is 0 or 1; both of n and m are not 0 at the same time; when m is 0, a is 2; when m is 1, a is 1; and A represents a counter anion of $[L_nNiX_m]^{a+}$, or a multi-component catalyst containing:
(a) a Ni halide compound, and
(b) an organic aluminum compound, and/or
(c) an electron donating component.

14. The process of claim 13, wherein the conjugated diene monomer is a substituted cyclohexadiene.

15. The process of claim 13, wherein the conjugated diene monomer is a 5–8-membered ring having at least one silicon or germanium atom in the ring.

16. The process of claim 13, wherein the double-bond containing monomer is at least one monomer selected from the group consisting of an olefin, an isoolefin, a branched α-olefin, a conjugated olefin, a cyclic olefin, a vinyl olefin, cyclic ether, and a lactone monomer.

17. The process of claim 13, wherein the poly(cyclic conjugated diene) is a copolymer selected from the group consisting of random copolymers, alternate copolymers, and block copolymers.

18. The process of claim 13, wherein the catalyst or multi-component catalyst is present in an amount of from $1 \times 10^{-6}$ to $1 \times 10^{-1}$ moles of the metal element of the catalyst per mole of conjugated diedne monomer and double-bond containing monomer.

* * * * *